United States Patent
Ishii et al.

(10) Patent No.: US 10,417,494 B2
(45) Date of Patent: Sep. 17, 2019

(54) LINE-OF-SIGHT DETECTION METHOD AND DEVICE

(71) Applicant: FUJITSU LIMITED, Kawasaki-shi, Kanagawa (JP)

(72) Inventors: Daisuke Ishii, Kawasaki (JP); Satoshi Nakashima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 144 days.

(21) Appl. No.: 15/262,104

(22) Filed: Sep. 12, 2016

(65) Prior Publication Data
US 2017/0091520 A1    Mar. 30, 2017

(30) Foreign Application Priority Data
Sep. 30, 2015    (JP) .................... 2015-193729

(51) Int. Cl.
*G06K 9/00*    (2006.01)
*G06F 3/01*    (2006.01)
(Continued)

(52) U.S. Cl.
CPC .......... *G06K 9/0061* (2013.01); *G06F 3/013* (2013.01); *G06K 9/00604* (2013.01);
(Continued)

(58) Field of Classification Search
CPC ....... G06F 3/013; A61B 3/113; A61B 3/0025; A61B 3/14; G02B 27/0093;
(Continued)

(56) References Cited

U.S. PATENT DOCUMENTS 7,130,453 B2 * 10/2006 Kondo ............... G06K 9/00604
382/117
8,649,583 B2 * 2/2014 Tsukizawa ............. A61B 3/113
348/241
(Continued)

FOREIGN PATENT DOCUMENTS

| JP | 2003-317102 | 11/2003 |
| JP | 2004-005167 | 1/2004 |
| JP | 2014-067102 | 4/2014 |

OTHER PUBLICATIONS

Sigut et al., Iris Center Corneal Reflection Method for Gaze Tracking Using Visible Light, Oct. 14, 2010 (1st instance)[retrieved Jun. 6, 2018], IEEE Transactions on Biomedical Engineering, vol. 58, Issue:2,pp. 411-419, Retrieved from the Internet: https://ieeexplore.ieee.org/document/5601753/#full-text-section.*
(Continued)

*Primary Examiner* — Andrew M Moyer
*Assistant Examiner* — Dennis Rosario
(74) *Attorney, Agent, or Firm* — Fujitsu Patent Center

(57) ABSTRACT

A line-of-sight detection method includes detecting an eye region of a subject from an image, determining whether a position of a boundary between a pupil and an iris is detected from the image based on a brightness change in the eye region, executing, in accordance with a result of the determining, at least one of first processing in which a position of a center of the pupil is detected based on an outline of the pupil and second processing in which the position of the center of the pupil is detected based on another outline of the iris, and detecting a line of sight of the subject based on the position of the center of the pupil detected by the at least one of the first processing and the second processing.

17 Claims, 18 Drawing Sheets

(51) Int. Cl.
*G06K 9/46* (2006.01)
*G06K 9/50* (2006.01)

(52) U.S. Cl.
CPC ....... *G06K 9/00617* (2013.01); *G06K 9/4604* (2013.01); *G06K 9/50* (2013.01)

(58) Field of Classification Search
CPC ............. G06K 9/00604; G06K 9/0061; G06K 9/00597; G06K 9/00617; G06T 2207/30041
See application file for complete search history.

(56) References Cited

U.S. PATENT DOCUMENTS

| | | | | |
|---|---|---|---|---|
| 9,021,395 B2 * | 4/2015 | Sakata | ............. | H04N 21/44218 715/811 |
| 9,092,671 B2 * | 7/2015 | Noda | ................... | A61B 5/1171 |
| 9,152,850 B2 * | 10/2015 | Mogi | ................ | G06K 9/00288 |
| 9,250,703 B2 * | 2/2016 | Hernandez-Abrego | ..................... | A63F 13/213 |
| 9,355,315 B2 * | 5/2016 | Vugdelija | ............ | G06K 9/6218 |
| 2014/0085451 A1 | 3/2014 | Kamimura et al. | | |
| 2017/0188823 A1 * | 7/2017 | Ganesan | ................ | A61B 3/113 |

OTHER PUBLICATIONS

Ryan et al., Limbus / Pupil Switching for Wearable Eye Tracking Under Variable Lighting Conditions, Mar. 26-28, 2008 [retrieved Jun. 3, 2018], Proceedings of the 2008 Symposium on Eye Tracking Research & Applications, pp. 61-64. Retrieved from the Internet: https://dl.acm.org/citation.cfm?id=1344487.*
Li et al., openEyes: a low-cost head-mounted eye-tracking solution, Mar. 27-29, 2006 [retrieved Dec. 12, 2018], Proceedings of the 2006 Symposium on Eye Tracking Research & Applications, pp. 95-100 & 176. Retrieved from the Internet: https://dl.acm.org/citation.cfm?id=1117350 (Year: 2006).*
EESR, Extended European Search Report dated Feb. 9, 2017 for corresponding European Patent Application No. 16187589.3, 12 pages.
Ryan, Wayne J. et al., "Limbus / Pupil Switching for Wearable Eye Tracking Under Variable Lighting Conditions", Eye Tracking Research & Applications: Proceedings; ETRA 2008, [Eye Tracking Research and Applications Symposium], Savannah, Georgia, USA, Mar. 26-28, 2008, pp. 61-64, XP055340394.
Li, Dongheng et al., "Starburst: A hybrid algorithm for video-based eye tracking combining feature-based and model-approaches", Proceedings of the 2005 IEEE Computer Society Conference on Computer Vision and Pattern Recognition, Sep. 21, 2005, pp. 79-79, XP055340851.
Ryan, Wayne J. et al., "Adapting Starburst for Elliptical Iris Segmentation", Biometrics: Theory, Applications and Systems, 2008. BTAS 2008, 2nd IEEE International Conference on, IEEE, Piscataway, NJ, USA, Sep. 29, 2008, pp. 1-7, XP031371208.
Valenti, Roberto et al., "Accurate Eye Center Location through Invariant Isocentric Patterns", IEEE Transaction on Pattern Analysis and Machine Intelligence, IEEE Computer Society, USA, vol. 34, No. 9, Sep. 1, 2012, pp. 1785-1798, XP011490708.
Tang, Jinshan et al., "A Real-time Surveillance and Evaluation System of the Audience's Reaction for Meeting Sessions", SPIE—International Society for Optical Engineering, Proceedings, vol. 3837, Aug. 26, 1999, XP055340852.
Zhang, Wei et al., "Fuzzy Multi-Class Support Vector Machine for Cooperative Network Intrusion detection", Proceedings of the 9th IEEE International Conference on Cognitive Informatics (ICCI), 2010, Piscataway, NJ, USA, Jul. 7, 2010, pp. 811-818, XP031773997.
European Office Action dated Jul. 18, 2018 for corresponding European Patent Application No. 16187589.3, 6 pages.

* cited by examiner

FIG. 17
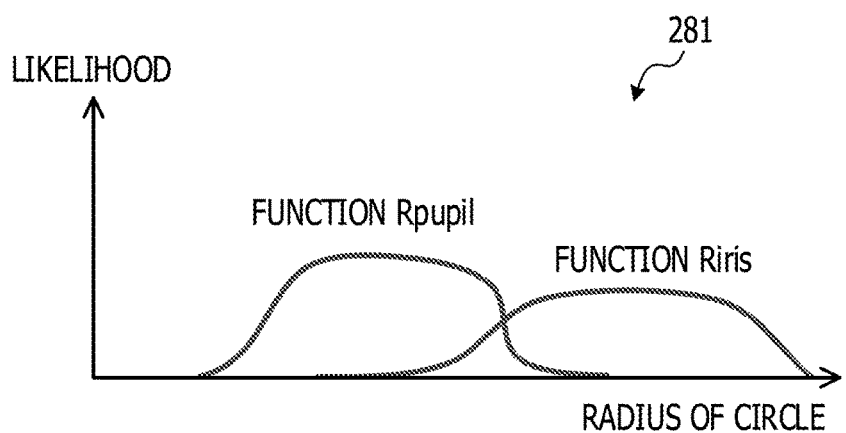
INCREASE WEIGHTING OF FUNCTION Riris FOR IRIS IN CASE WHERE EDGES OF PUPIL MAY NOT BE DETECTED
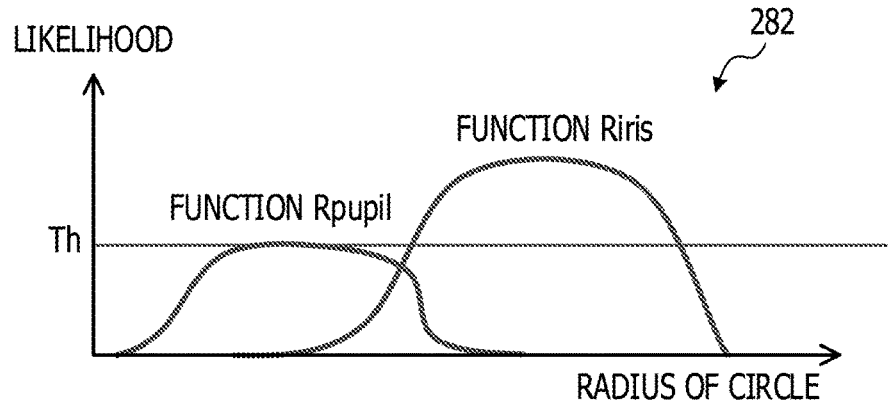

LINE-OF-SIGHT DETECTION METHOD AND DEVICE

CROSS-REFERENCE TO RELATED APPLICATION

This application is based upon and claims the benefit of priority of the prior Japanese Patent Application No. 2015-193729, filed on Sep. 30, 2015, the entire contents of which are incorporated herein by reference.

FIELD

The embodiments disclosed herein are related to line-of-sight detection techniques.

BACKGROUND

Line-of-sight detection techniques for detecting the direction of the line of sight and the position of the gaze of a user are known. An example of a line-of-sight detection method is a method in which a corneal reflection of a light source and a pupil are detected from an image obtained by capturing an image of an eye of a user and the line of sight of the user is detected based on the positional relationship between the corneal reflection and the center of the pupil.

It is demanded that the position of the corneal reflection and the position of the center of the pupil be accurately detected in this method. However, when the distance between the illuminating light source and the camera is small, light from the illuminating light source is reflected by the retina and this reflected light reaches the camera via the pupil. Consequently, the occurrence of a bright pupil state is known in which the entire pupil is bright in the image captured by the camera. In the case where a bright pupil state exists, the outline of the corneal reflection may become indistinct and it may be difficult to detect the corneal reflection.

In response to this problem, a technique has been proposed in which the distance from the camera to the face of the user is estimated, it is determined whether a bright pupil state exists based on a ratio of the estimated value of the distance to the distance between the illuminating light source and the camera and the line-of-sight detection method to be used is switched in accordance with the result of this determination (For example, Japanese Laid-open Patent Publication No. 2014-67102).

SUMMARY

According to an aspect of the invention, a line-of-sight detection method includes detecting an eye region of a subject from an image, determining whether a position of a boundary between a pupil and an iris is detected from the image based on a brightness change in the eye region, executing, in accordance with a result of the determining at least one of first processing in which a position of a center of the pupil is detected based on an outline of the pupil and second processing in which the position of the center of the pupil is detected based on another outline of the iris, and detecting a line of sight of the subject based on the position of the center of the pupil detected by the at least one of the first processing and the second processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 illustrates an example of the relationship between templates and likelihood.

DESCRIPTION OF EMBODIMENTS

Figure 1:
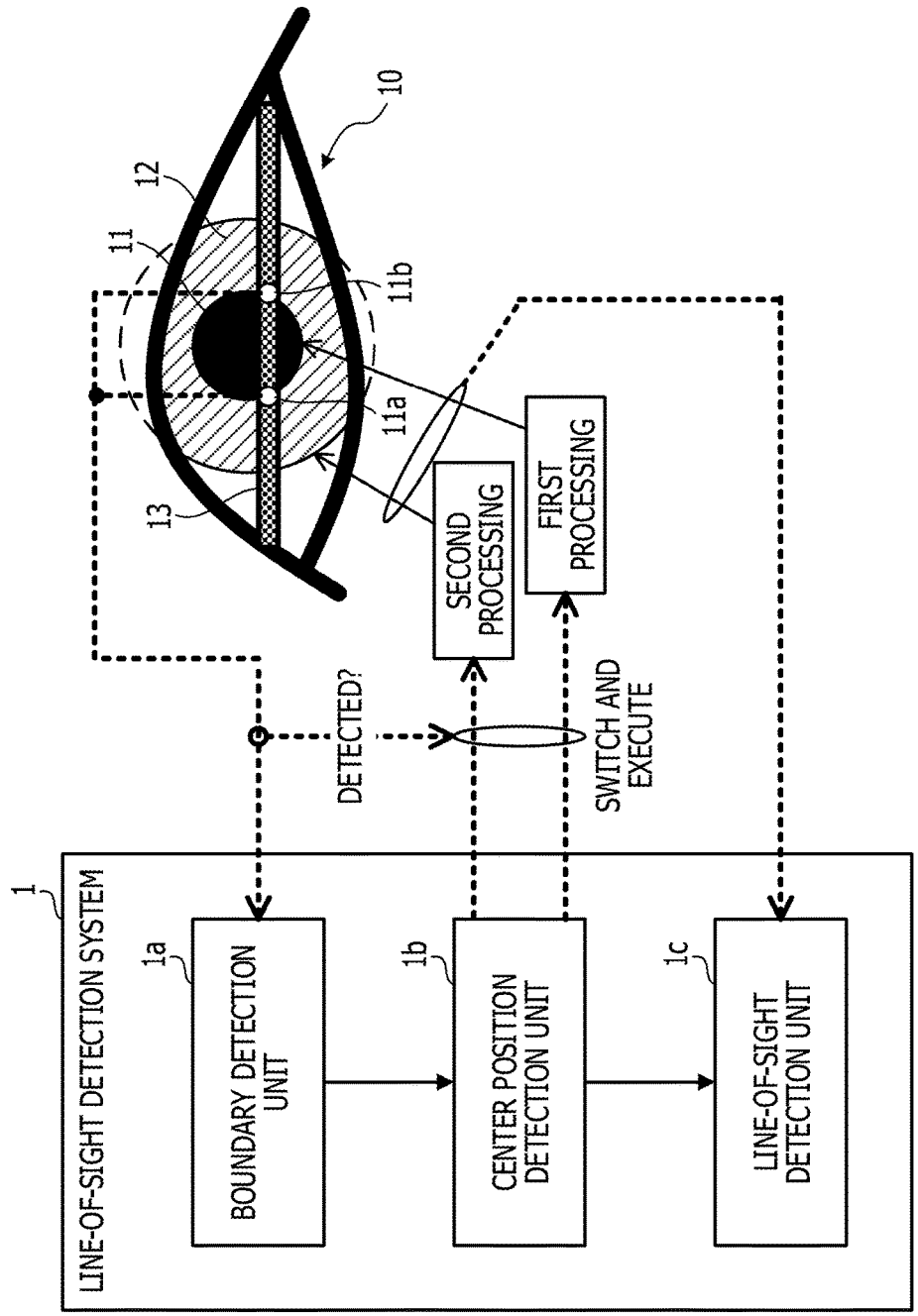
FIG. 1 illustrates an example of the configuration and an example of processing of a line-of-sight detection system according to a first embodiment.

Examples of a method of detecting the center of the pupil include a method in which the center of the pupil is detected from the outline of the pupil and a method in which the center of the pupil is obtained from the outline of the iris. Out of these methods, it is possible to detect the center of the pupil with higher accuracy with the former method. This is because, in a normal state, the difference in brightness between the pupil and the iris is larger than the difference in brightness between the iris and the sclera and the upper part or the lower part of the iris is easily hidden by the eyelid and therefore the outline of the pupil may be detected more clearly than the outline of the iris.

However, since the pupil is bright in the above-mentioned bright pupil state, the difference in brightness between the pupil and the iris is reduced and it becomes more difficult to detect the outline of the pupil than in the case of the normal state, that is, a state that is not the bright pupil state. Furthermore, a state called a "semi-bright pupil" state in which the pupil is slightly brighter than normal may also exist, and in this case, the difference in brightness between the pupil and the iris becomes almost non-existent and it is difficult to detect the outline of the pupil.

Consequently, a method has been considered in which it is detected whether the bright pupil or semi-bright pupil state exists, and then processing in which the center of the pupil is detected from the outline of the pupil and processing in which the center of the pupil is obtained from the outline of the iris are switched between in accordance with the result of this detection. However, in the above-described method of determining whether the bright pupil state exists based on the result of estimating the distance between the camera and the face of a user, the accuracy with which the distance is estimated is not sufficiently high and there are individual differences in brightness between irises, and therefore the accuracy with which it is determined whether the bright pupil state exists is not high. Consequently, there is a problem in that the accuracy with which the center of the pupil is detected is reduced.

According to one aspect, techniques disclosed in the embodiments discussed herein aim to improve the accuracy with which the position of the center of a pupil is detected.

Hereafter, embodiments will be described in detail while referring to the drawings.

First Embodiment

FIG. 1 illustrates an example of the configuration and an example of processing of a line-of-sight detection system according to a first embodiment. A line-of-sight detection system 1 according to the first embodiment includes a boundary detection unit 1a, a center position detection unit 1b, and a line-of-sight-detecting unit 1c. The processing performed by each of the boundary detection unit 1a, the center position detection unit 1b, and the line-of-sight-detecting unit 1c is implemented by a processor executing a prescribed program, for example. In addition, at least some of the processing functions of the boundary detection unit 1a, the center position detection unit 1b, and the line-of-sight-detecting unit is may be implemented in a different device from the other processing functions.

The boundary detection unit is detects a boundary between a pupil 11 and an iris 12, from an eye region 10 of a user in a captured image, by performing edge detection based on brightness. For example, the boundary detection unit is sets a line-shaped or band-shaped detection region 13 inside the eye region 10 and performs edge detection in a longitudinal direction of the detection region 13. The boundary detection unit is detects the positions of boundaries between the pupil 11 and the iris 12 based on the positional symmetry, in the detection region 13, of a first edge where brightness decreases between before and after the edge and a second edge where brightness increases between before and after the edge, among detected edges, and in the example illustrated in FIG. 1, two boundaries 11a and 11b between the pupil 11 and the iris 12 are detected. The boundaries 11a and 11b are examples of a first edge and a second edge, respectively.

Here, since the pupil 11 is normally sufficiently darker than the iris 12, the boundary detection unit is may detect the boundaries between the pupil 11 and the iris 12 by performing edge detection. However, in a state where the brightnesses of the pupil 11 and the iris 12 are substantially the same (hereafter, referred to as "semi-bright pupil state"), the boundary detection unit is may not be able to detect the boundaries between the pupil 11 and the iris 12 by performing edge detection.

The center position detection unit 1b switches between and executes first processing and second processing in accordance with whether the boundaries between the pupil 11 and the iris 12 are detected by the boundary detection unit ha. The first processing and the second processing both detect the position of the center of the pupil 11, but have different processing procedures.

For example, in the first processing, the outline of the pupil 11 is detected and the position of the center of the pupil 11 is detected based on the result of the detection. On the other hand, in the second processing, the outline of the iris 12 is detected and the position of the center of the pupil 11 is detected based on the result of the detection.

In addition, as another example, in the first processing, the position of the center of the pupil 11 is detected by placing importance on the detection result of the outline of the pupil 11. Whereas, in the second processing, the position of the center of the pupil 11 is detected by placing importance on the detection result of the outline of the iris 12.

In both examples, the first processing is processing that is suitable for the case of a dark pupil state and the second processing is processing that is suitable for the case of a semi-bright pupil state. In this case, the center position detection unit 1b executes the first processing when the boundaries between the pupil 11 and the iris 12 are detected by the boundary detection unit 1a. Whereas, the center position detection unit 1b executes the second processing when the boundaries between the pupil 11 and the iris 12 are not detected by the boundary detection unit 1a.

The line-of-sight-detecting unit 1c detects the direction of the line of sight or the position of the gaze of a user based on the detection result of the position of the center of the pupil 11 obtained by the center position detection unit 1b. For example, the line-of-sight-detecting unit is detects the direction of the line of sight or the position of the gaze of the user based on a detected position of a corneal reflection and the detection result of the position of the center of the pupil 11 in the eye region 10.

In the above-described line-of-sight detection system 1, the boundary detection unit is detects the boundaries between the pupil 11 and the iris 12 by performing edge detection based on brightness. The center position detection unit 1b may determine whether the semi-bright pupil state exists based on whether the boundary between the pupil 11 and the iris 12 is detected by the boundary detection unit 1a. The center position detection unit 1b may select and execute the appropriate processing for detecting the center of the pupil 11 based on whether the semi-bright pupil state exists. Thus, the center of the pupil 11 may be accurately detected even in the case where the semi-bright pupil state exists. Therefore, the accuracy with which the center of the pupil 11 is detected may be improved.

Second Embodiment

Figure 2:
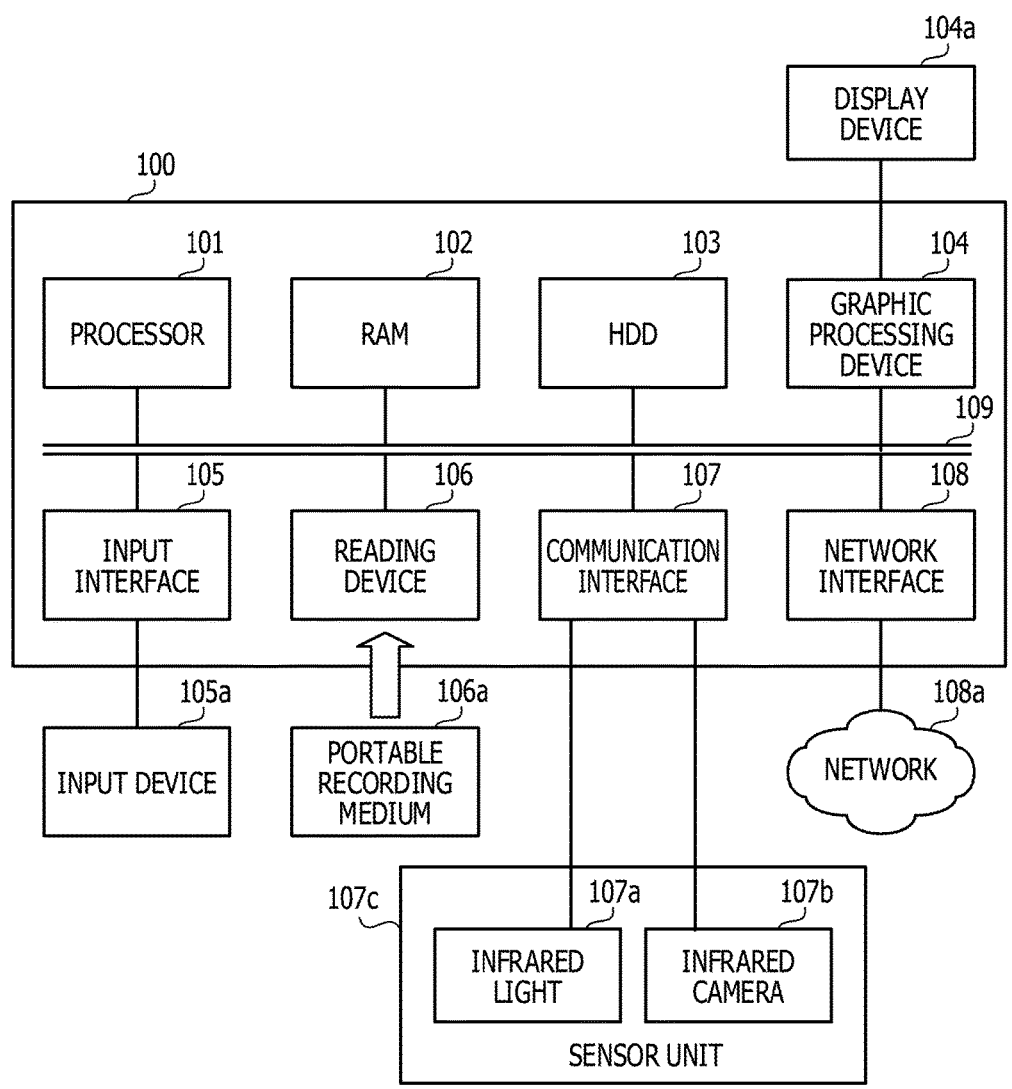
FIG. 2 illustrates an example of the hardware configuration of a line-of-sight detection device according to a second embodiment.

FIG. 2 illustrates an example of the hardware configuration of a line-of-sight detection device according to a second embodiment. A line-of-sight detection device 100 according to the second embodiment may be implemented as a computer as illustrated in FIG. 2, for example.

The entirety of the line-of-sight detection device 100 is controlled by a processor 101. The processor 101 may be formed of multiple processors. The processor 101 is, for example, a central processing unit (CPU), a micro-processing unit (MPU), a digital signal processor (DSP), an application specific integrated circuit (ASIC) or a programmable logic device (PLD). In addition, the processor 101 may be combination of two or more elements from among a CPU, an MPU, a DSP, an ASIC, and a PLD.

A random access memory (RAM) 102 and a plurality of peripheral devices are connected to the processor 101 via a bus 109.

The RAM 102 is used as a main storage device of the line-of-sight detection device 100. At least part of an operating system (OS) program and application programs, to be executed by the processor 101, are temporarily stored in the RAM 102. In addition, various data that is used in the processing performed by the processor 101 is stored in the RAM 102.

Examples of the peripheral devices connected to the bus 109 include a hard disk drive (HDD) 103, a graphic processing device 104, an input interface 105, a reading device 106, a communication interface 107, and a network interface 108.

The HDD 103 is used as an auxiliary storage device of the line-of-sight detection device 100. An OS program, application programs, and various data are stored in the HDD 103. Another type of non-volatile storage device such as a solid state drive (SSD) may also be used as the auxiliary storage device.

A display device 104a is connected to the graphic processing device 104. The graphic processing device 104 displays images on the display device 104a in accordance with commands from the processor 101. Examples of the display device include a liquid crystal display and an organic electroluminescence (EL) display.

An input device 105a is connected to the input interface 105. The input interface 105 transmits a signal output from the input device 105a to the processor 101. Examples of the input device 105a include a keyboard and a pointing device. Examples of a pointing device include a mouse, a touch panel, a tablet, a touch pad, and a trackball.

A portable recording medium 106a is detachably attached to the reading device 106. The reading device 106 reads out data that is recorded on the portable recording medium 106a and transmits the read out data to the processor 101. Examples of the portable recording medium 106a include an optical disc, a magneto-optical disk, and a semiconductor memory.

The communication interface 107 transmits data to and receives data from external devices. In this embodiment, an infrared light 107a and an infrared camera 107b are connected as external devices. The infrared light 107a radiates infrared light onto the face of a user who is the target of line-of-sight detection. The infrared camera 107b detects reflected light out of the radiated infrared light. The processor 101 detects the line of sight of a user by analyzing an image captured by the infrared camera 107b. The infrared light 107a and the infrared camera 107b are integrally formed as a sensor unit 107c, for example.

The network interface 108 transmits data to and receives data from other devices via a network 108a.

The processing functions of the line-of-sight detection device 100 may be implemented by the above-described hardware configuration.

The above-described line-of-sight detection device 100 detects the line of sight of a user based on an image of the region of an eye of a user captured by the infrared camera 107b. As a method of line-of-sight detection, a "corneal reflection method" is used in which a line-of-sight direction is detected from the positional relationship between the position of a corneal reflection and the position of the center of the pupil.

Figure 3A:
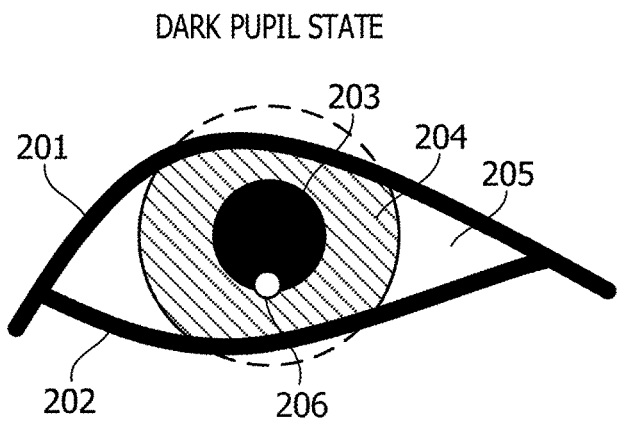
FIGS. 3A, 3B, and 3C illustrate states of a pupil.
Figure 3B:
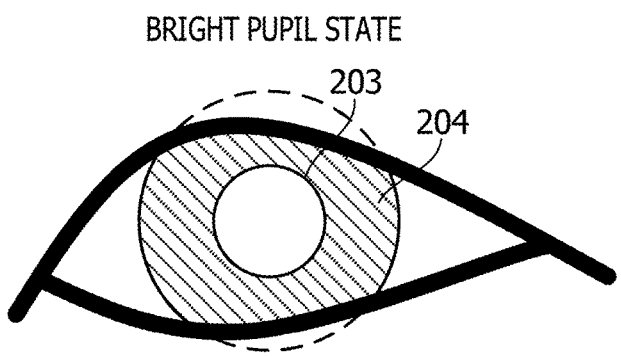
Figure 3C:
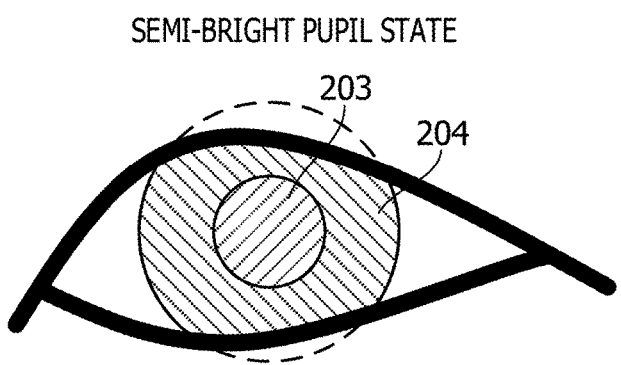

Here, FIGS. 3A, 3B, and 3C illustrate states of a pupil. FIG. 3A illustrates a dark pupil state (normal state), FIG. 3B illustrates a bright pupil state, and FIG. 3C illustrates a semi-bright pupil state.

In the following description, an "eyeball region", where the eyeball is exposed, is defined as a region that is enclosed by a lower edge 201 of the upper eyelid and an upper edge 202 of the lower eyelid. Within the eyeball region, the region of a pupil 203 and the region of an iris 204 exist in the form of concentric circles and the region of the sclera (the white of the eye) 205 exists outside the iris 204. In addition, a corneal reflection 206, which is reflected light out of infrared light from the infrared light 107a, appears in the eyeball region when line-of-sight detection is performed.

As illustrated in FIG. 3A, in the normal state, the "dark pupil state" exists in which the pupil 203 is sufficiently darker than the iris 204. However, in the case where the distance between the infrared light 107a and the infrared camera 107b is small, light from the infrared light 107a is reflected by the retina and the reflected light reaches the infrared camera 107b via the pupil 203. As a result, there are also the "bright pupil state" in which the pupil 203 is brighter than the iris 204 as illustrated in FIG. 3B and the "semi-bright pupil state" in which the pupil 203 and the iris 204 have substantially the same brightness as illustrated in FIG. 3C.

The line-of-sight detection device 100 detects the position of the corneal reflection 206 and the position of the center of the pupil 203 from an image in which the eyeball region is captured, as described above. Examples of a method for detecting the position of the center of the pupil 203 include a method in which a detection result of the outline of the pupil 203 is used and a method in which a detection result of the outline of the iris 204 is used.

In the dark pupil state, the method in which detection result of the outline of the pupil 203 is used has higher accuracy for detecting the position of the center of the pupil 203. This is because, in the dark pupil state, generally, the difference in brightness between the pupil 203 and the iris 204 is larger than the difference in brightness between the iris 204 and the sclera 205, and the outline of the pupil 203 is more distinct. In addition, in the state where the eyelids are open, although the entirety of the outline of the pupil 203 is exposed, often part of the outline of the iris 204 is covered by the eyelid. Consequently, the outline of the pupil 203 may be detected more easily and with higher accuracy in the case where the pupil 203 and the iris 204 are detected with circle detection.

However, in the semi-bright pupil state, the difference in brightness between the pupil 203 and the iris 204 is smaller than in the dark pupil state and therefore the accuracy with which the outline of the pupil 203 is detected decreases. On the other hand, the accuracy with which the outline of the iris 204 is detected does not change between the dark pupil state, the bright pupil state and the semi-bright pupil state. Therefore, in the semi-bright pupil state, the method in which detection result of the outline of the iris 204 is used has higher accuracy for detecting the position of the center of the pupil 203.

As described above, the semi-bright pupil state occurs in the case where the distance between the infrared light 107a and the infrared camera 107b is short. Therefore, in particular, when the infrared light 107a and the infrared camera 107b are integrated as the sensor unit 107c as illustrated in FIG. 2 and the sensor unit 107c is reduced in size, it is difficult to avoid occurrence of the semi-bright pupil state.

Consequently, the line-of-sight detection device 100 performs edge detection using brightness information inside the eyeball region and switches the processing to be used for detecting the position of the center of the pupil 203 in accordance with whether the edge of the pupil 203 may be detected. Thus, it is ensured that the position of the center of the pupil 203 may be stably detected with high accuracy and consequently the accuracy of line-of-sight detection is improved.

Figure 4:
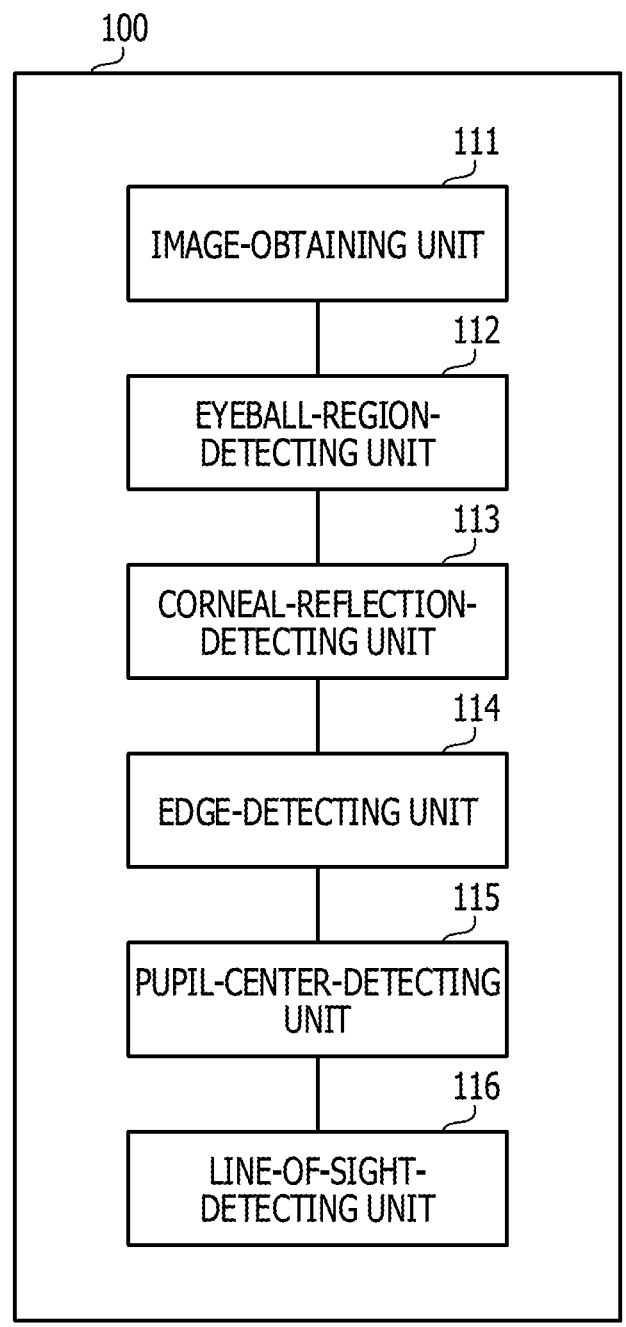
FIG. 4 is a block diagram illustrating an example of the configuration of processing functions of a line-of-sight detection device.

FIG. 4 is a block diagram illustrating an example of the configuration of processing functions of a line-of-sight detection device. The line-of-sight detection device 100 includes an image-obtaining unit 111, an eyeball-region-detecting unit 112, a corneal-reflection-detecting unit 113, an edge-detecting unit 114, a pupil-center-detecting unit 115 and a line-of-sight-detecting unit 116. These processing functions are implemented by the processor 101 executing a prescribed program, for example.

At least some of these processing functions may be implemented in a different device from the other processing functions. For example, the image-obtaining unit 111, the eyeball-region-detecting unit 112, the corneal-reflection-detecting unit 113, the edge-detecting unit 114, and the pupil-center-detecting unit 115 may be implemented in the sensor unit 107c and the line-of-sight-detecting unit 116 may be implemented in the line-of-sight detection device 100.

The image-obtaining unit 111 obtains an image in which the face of the user is captured by the infrared camera 107b. The data of the obtained image is temporarily stored in a storage device (for example, RAM 102) of the line-of-sight detection device 100.

The eyeball-region-detecting unit 112 detects the eyeball region from the image obtained by the image-obtaining unit 111. The eyeball region is detected as a region that is enclosed by the lower edge of the upper eyelid and the upper edge of the lower eyelid, for example. The eyeball-region-detecting unit 112, for example, detects a face region from the obtained image and detects the eyeball region from the detected face region. Detection of the face region and detection of the eyeball region from the face region may be performed by using identification processing utilizing template matching or image characteristics, for example.

The corneal-reflection-detecting unit 113 detects the position of the corneal reflection from the eyeball region based on a brightness distribution of the detected eyeball region. In the eyeball region, the brightness of the region of the corneal reflection is much higher than that of the rest of the eyeball region. Therefore, the corneal-reflection-detecting unit 113 detects a circular region, out of the eyeball region, for which the brightness is equal to or higher than a prescribed threshold as the corneal reflection. The corneal-reflection-detecting unit 113 may also detect the position of the corneal reflection through corner detection, for example.

The edge-detecting unit 114 sets a line-shaped or band-shaped edge detection region in a substantially horizontal direction in the eyeball region and detects edges by detecting differences in brightness in the longitudinal direction of the edge detection region. The edge-detecting unit 114 determines whether both the boundaries between the pupil and the iris (that is, the edges of the pupil) and the boundaries between the iris and the sclera (that is, the edges of the iris) have been detected, whether only one of types of boundaries has been detected or whether neither of the types of boundaries has been detected based on the positions of the detected edges.

The pupil-center-detecting unit 115 detects the position of the center of the pupil based on the brightness of the eyeball region. At this time, the pupil-center-detecting unit 115 switches the processing used to detect the position of the center of the pupil based on the detection result obtained by the edge-detecting unit 114. In this switching, processing in which importance is placed upon the detection result of the outline of the pupil and processing in which importance is placed upon the detection result of the outline of the iris are switched between. In the case where both the edges of the pupil and the edges of the iris are detected by the edge-detecting unit 114, the former processing is switched to and in the case where only the edges of the iris are detected, the latter processing is switched to.

The line-of-sight-detecting unit 116 detects the direction of the line of sight of the user based on the positional relationship between the position of the corneal reflection detected by the corneal-reflection-detecting unit 113 and the position of the center of the pupil detected by the pupil-center-detecting unit 115. In addition, the line-of-sight-detecting unit 116 may detect the position of the gaze of the user based on the detected line of sight direction.

Next, the processing performed by the edge-detecting unit 114 will be described.

Figure 5:
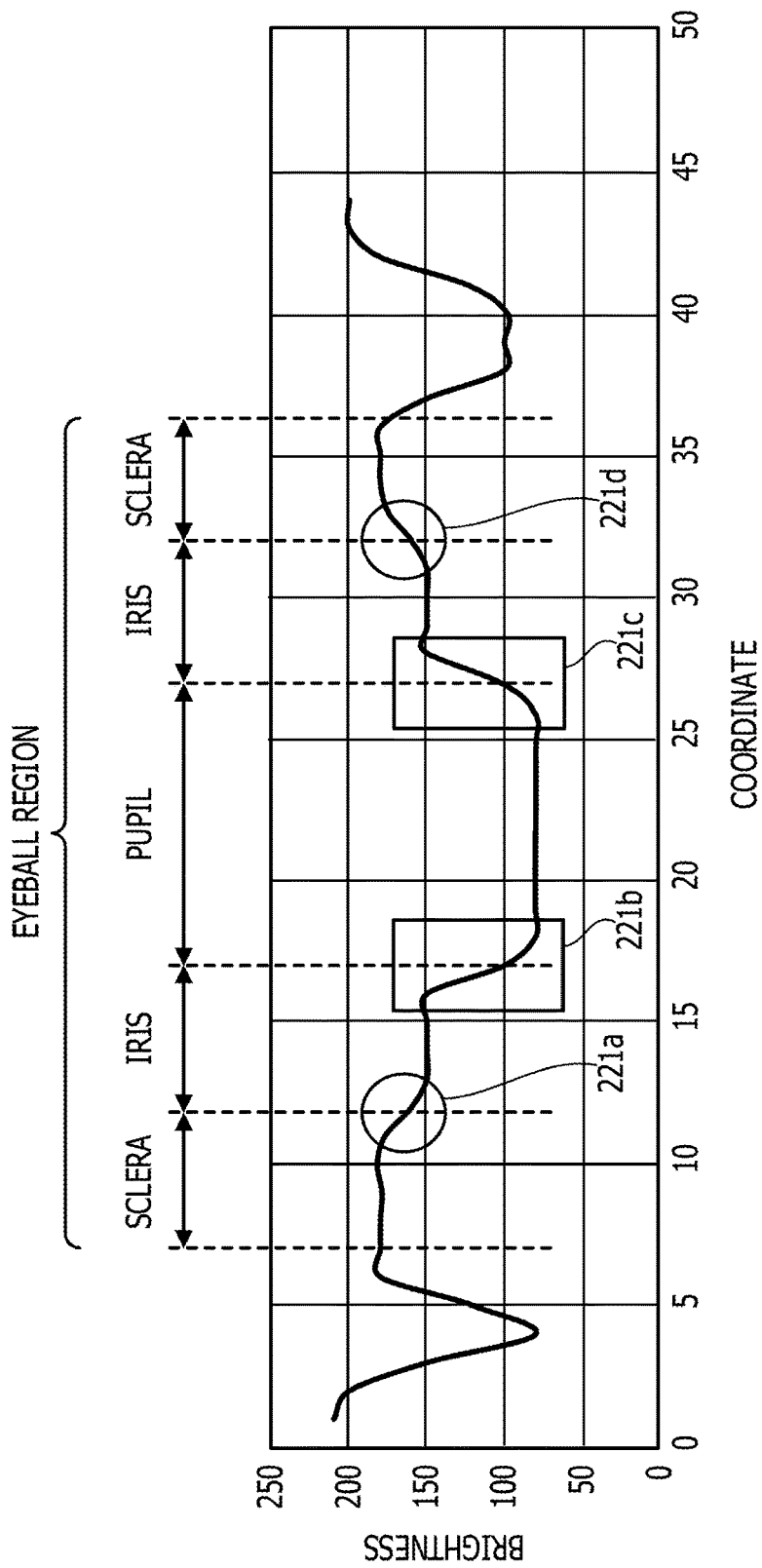
FIG. 5 illustrates a first example of an edge detection result.
Figure 6:
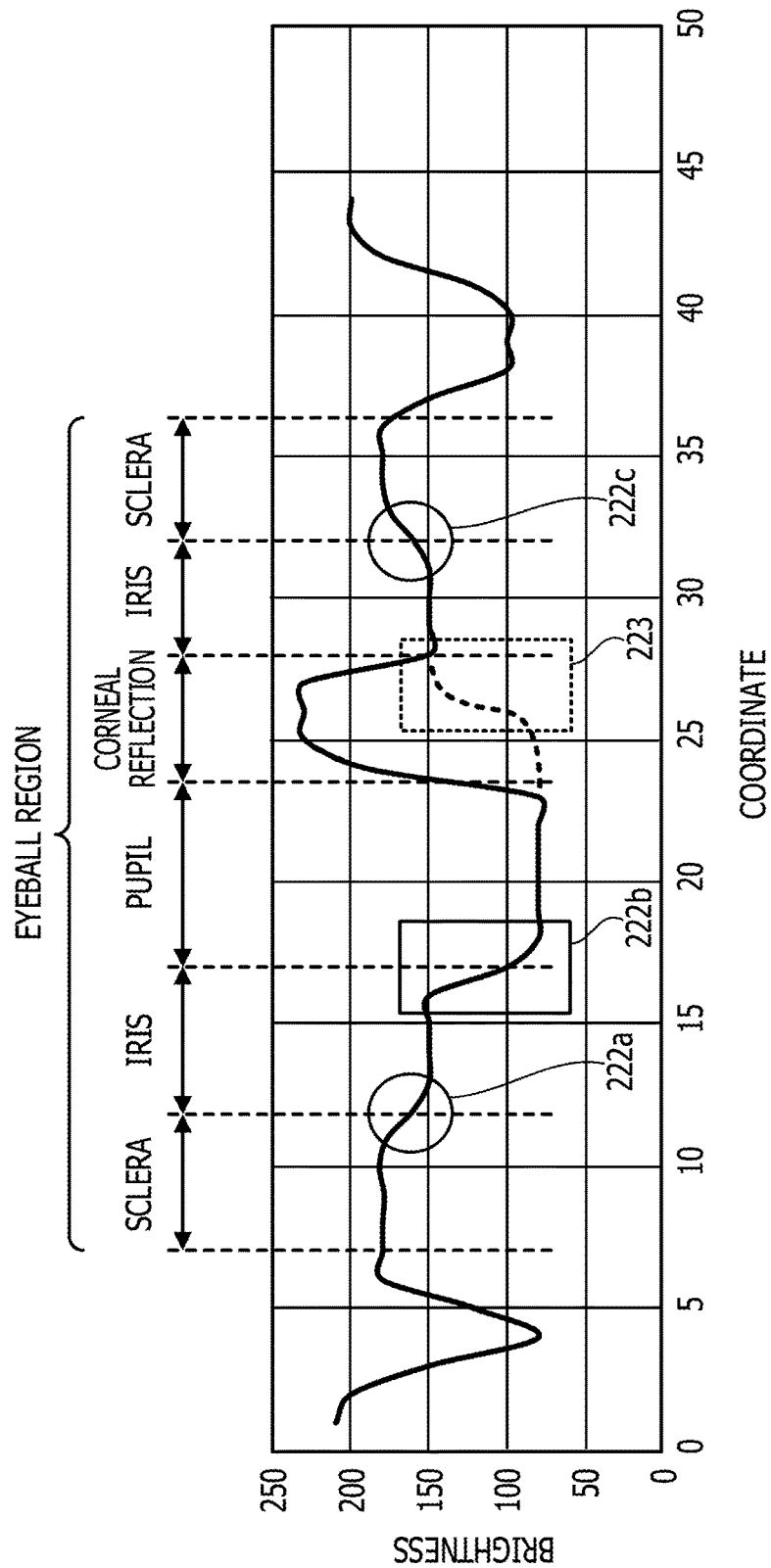
FIG. 6 illustrates a second example of an edge detection result.
Figure 7:
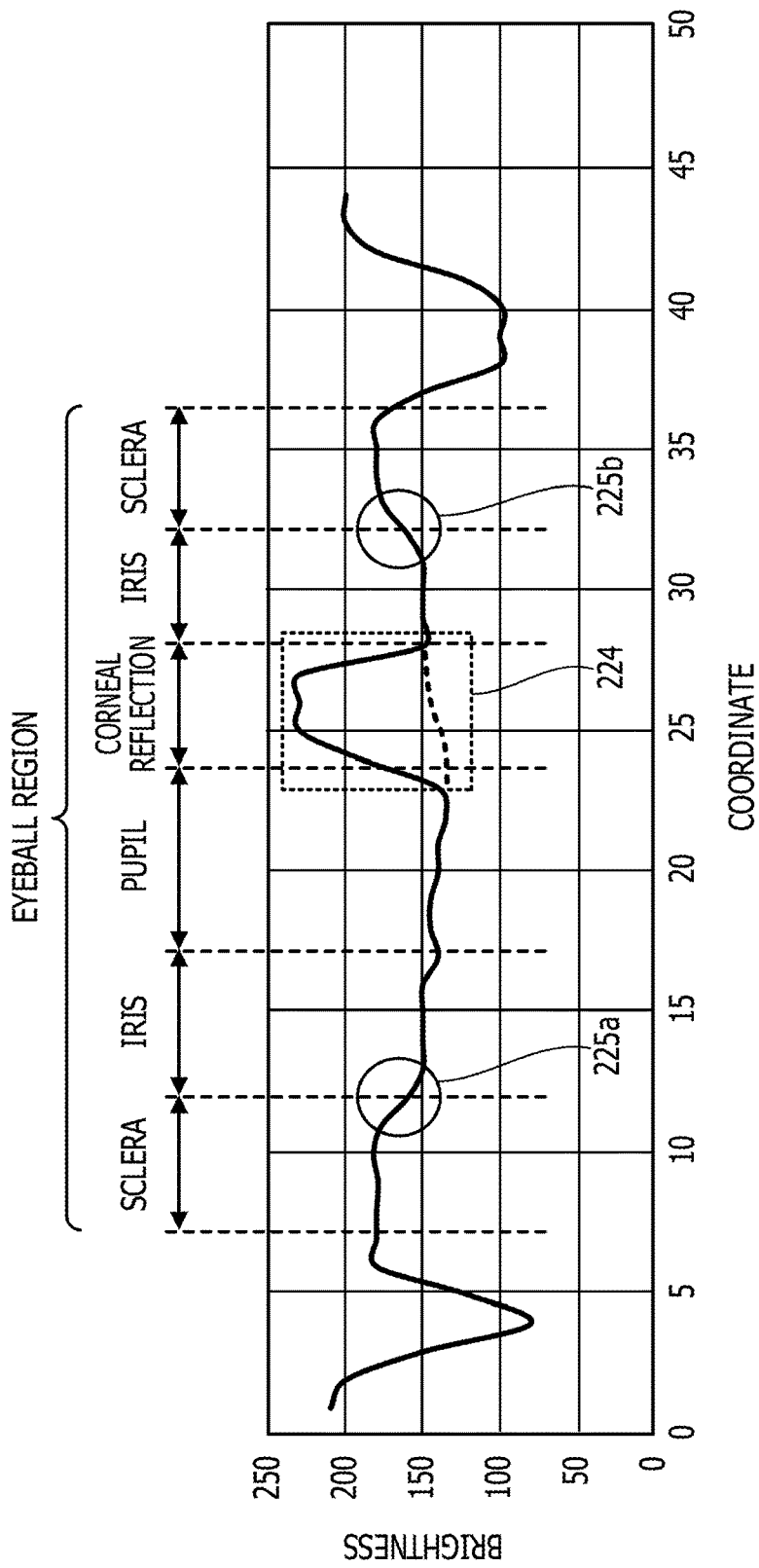
FIG. 7 illustrates a third example of an edge detection result.

The edge-detecting unit 114 sets a line-shaped or band-shaped edge detection region in a substantially horizontal direction in the eyeball region and detects edges by detecting differences in brightness between adjacent pixels in the longitudinal direction of the set edge detection region. Here, examples of edge detection results for an edge detection region are illustrated in FIGS. 5 to 7. In FIGS. 5 to 7, as an example, it is assumed that a horizontal line is set as the edge detection region in the eyeball region.

FIG. 5 illustrates a first example of an edge detection result. In the graph illustrated in FIG. 5, the horizontal axis represents coordinates along the longitudinal direction of the edge detection region and the vertical axis represents brightness. The same is true for the graphs illustrated in FIGS. 6 and 7 as well.

Within the eyeball region, the sclera, the iris, the pupil, the iris, and the sclera exist in this order along the edge detection region. That is, the iris and the sclera are located successively on both sides of the pupil. In addition, the boundaries of the regions are detected as edges by edge detection. Accordingly, the edge-detecting unit 114 performs edge detection along the edge detection region and determines whether detected edges are the edges of the pupil (the boundaries between the pupil and the iris) or the edges of the iris (the boundaries between the iris and the sclera) based on the symmetry of the positions of the edges. For example, the edge-detecting unit 114 determines that a pair of edge portions where the differences in brightness before and after the edge portions are substantially the same and where the signs of the gradients are opposite to each other are such a pair of edges.

The graph of FIG. 5 illustrates an example of detection of brightness in the dark pupil state. In this example, four edge portions 221a to 221d are detected in the eyeball region. Among these edge portions, the edge portion 221a and the edge portion 221d have substantially the same difference in brightness between before and after the edge portion and have gradients of opposite signs. From this, the edge portions 221a and 221d are each assumed to be the edge of the pupil or the edge of the iris.

In addition, the edge portion 221b and the edge portion 221c also have substantially the same difference in brightness between before and after the edge portions and have gradients of opposite signs. The edge portions 221b and 221c are located between the edge portion 221a and the edge portion 221d. Therefore, the edge-detecting unit 114 determines that the edge portions 221b and 221c are the edges of the pupil and determines that the edge portions 221a and 221d are the edges of the iris.

FIG. 6 illustrates a second example of an edge detection result. In the graph illustrated in FIG. 6, an example of detection of brightness is illustrated for a case in which a corneal reflection is superposed with the edge detection region in the dark pupil state.

In the example in FIG. 6, two edge portions 222a and 222c, which correspond to the edges of the iris, are detected, similarly to as in the example in FIG. 5. In addition, one edge portion 222b that corresponds to an edge of the pupil is also detected. However, a corneal reflection exists in a region 223 where the other edge of the pupil is expected to be and therefore the other edge is not detected.

Thus, in the case where a corneal reflection is superposed with the edge detection region, the edge-detecting unit 114 regards the region of the corneal reflection as an edge portion or flat portion. For example, the edge-detecting unit 114 considers that an edge portion is detected from the region of the corneal reflection in the case where the difference in brightness between before and after this region is equal to or higher than a prescribed threshold and considers that this region is not an edge portion and is a flat portion in the case where the difference in brightness is less than the threshold.

The edge-detecting unit 114 determines the positions of the edges of the pupil and the edges of the iris based on the symmetry of edge portions detected in this way, and consequently the positions of the edges may be detected even in the case where a corneal reflection is superposed with the edge detection region. In the example of FIG. 6, the region 223 is determined to be an edge portion and this edge portion and the edge portion 222b are determined to have substantially the same difference in brightness between before and after the edge portions and to have gradients of opposite signs. As a result, the edge-detecting unit 114 determines that the edge portion 222b and the region 223 are the edges of the pupil and determines that the edge portions 222a and 222c are the edges of the iris.

FIG. 7 illustrates a third example of an edge detection result. In the graph illustrated in FIG. 7, an example of detection of brightness is illustrated for a case in which a corneal reflection is superposed with the edge detection region in the semi-bright pupil state.

In the example in FIG. 7, a corneal reflection is detected in a region 224. The edge-detecting unit 114 regards the region 224 not as an edge portion but, rather, as a flat portion from the fact that the difference in brightness between before and after the region 224 is less than the prescribed threshold, for example.

In addition, in the example in FIG. 7, edge portions 225a and 225b are detected. The edge portions 225a and 225b have substantially the same difference in brightness between before and after the edge portions and have gradients of opposite signs. In addition, a pair of edge portions is not detected in the region between the edge portion 225a and the edge portion 225b. As a result, the edge-detecting unit 114 determines that the edge portions 225a and 225b are the edges of the iris and determines that the edges of the pupil are not able to be detected. In such a case where the edges of the pupil are not able to be detected, it is considered that the semi-bright pupil state exists. Accordingly, the pupil-center-detecting unit 115 executes detection processing for detecting the position of the center of the pupil in which importance is placed upon detection results for the outline of the iris based on the determination result obtained by the edge-detecting unit 114.

FIGS. 8A to 8D illustrate examples of setting of the edge detection region performed by the edge-detecting unit. As described above, the edge-detecting unit 114 sets a line-shaped or band-shaped edge detection region in a substantially horizontal direction in the eyeball region. As illustrated in FIGS. 8A to 8D, various methods may be employed as a method of setting the edge detection region.

Figure 8A:
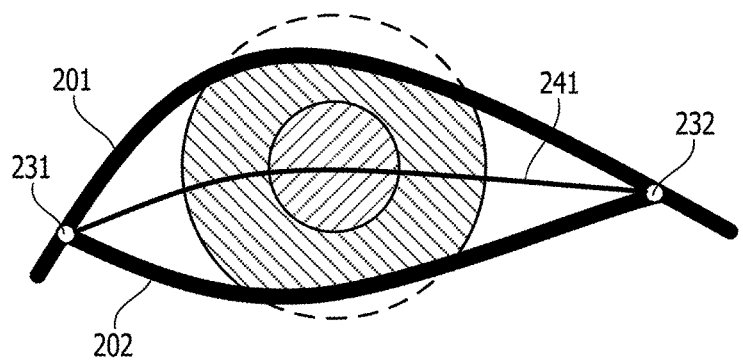
FIGS. 8A, 8B, 8C, and 8D illustrate examples of setting of an edge detection region performed by an edge-detecting unit.

For example, as illustrated in FIG. 8A, the edge-detecting unit 114 sets an edge detection region 241 such that the edge detection region 241 connects an eye inner corner 231 and an eye outer corner 232 and passes between the lower edge 201 of the upper eyelid and the upper edge 202 of the lower eyelid.

Figure 8B:
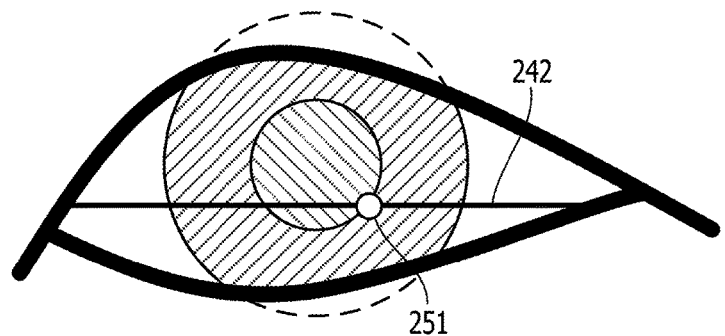

In addition, the edge-detecting unit 114 may set a straight-line-shaped region in the eyeball region as the edge detection region. For example, as illustrated in FIG. 8B, the edge-detecting unit 114 sets a straight-line-shaped region, which passes through a corneal reflection 251, in the eyeball region as an edge detection region 242. Alternatively, the edge-detecting unit 114 may set a straight-line-shaped region that is arranged at a position that is spaced upward or downward away from the corneal reflection 251 by a fixed distance as the edge detection region. For example, in the case where the infrared light 107a radiates infrared light from below the face, it is highly probable that the center of the pupil will be located above the corneal reflection 251. It is clear that it would be preferable to set the edge detection region either above or below the corneal reflection 251 based on the positional relationship between the infrared camera 107b and the face.

Figure 8C:
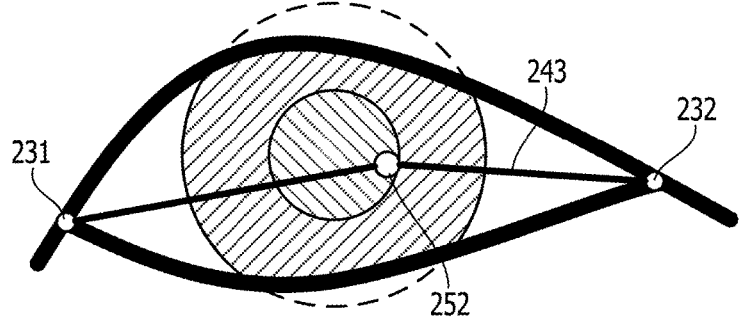

In addition, as illustrated in FIG. 8C, the edge-detecting unit 114 may set a bent-line-shaped region that passes through the eye inner corner 231, the corneal reflection 252 and the eye outer corner 232 as an edge detection region 243.

Furthermore, the edge-detecting unit 114 may set, from among a plurality of edge detection region candidates that are parallel to an edge detection region that has been preliminarily set using such a method, the candidate region that passes through the darkest region as the edge detection region.

In addition, the edge-detecting unit 114, for example, defines a straight-line-shaped region that connects the eye inner corner and the eye outer corner and defines a darkest point detected within a fixed range from the straight-line-shaped region as a new midpoint. Then, the edge-detecting unit 114 sets a straight-line-shaped region that passes through this new midpoint or a bent-line-shaped region that passes through the new midpoint, the eye inner corner and the eye outer corner as the edge detection region.

Figure 8D:
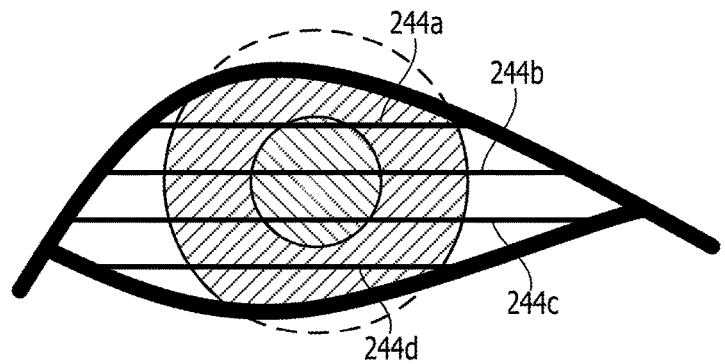

Furthermore, the edge-detecting unit 114 may set a plurality of edge detection regions inside the eyeball region. For example, as illustrated in FIG. 8D, the edge-detecting unit 114 sets straight-line-shaped edge detection regions 244a to 244d so as to parallel to each other inside the eyeball region. In the case where a plurality of edge detection regions are set in this way, the edge-detecting unit 114, for example, performs the above-described edge detection processing for each of the edge detection regions and adopts the processing result in which the greatest number of pairs of edge portions is detected.

In all of the examples described above, a case is described in which the eyeball region is specified based on the positions of the eye inner corner and the eye outer corner, but the edge-detecting unit 114 may instead set an edge detection portion within a fixed region that contains the eye in the case where a method is used in which the positions of the eye inner corner and the eye outer corner are not specified, for example.

Next, the processing performed by the pupil-center-detecting unit 115 will be described.

The pupil-center-detecting unit 115 switches between and executes detection processing for detecting the position of the center of the pupil in accordance with whether the edges of the pupil are detected by the edge-detecting unit 114. In the case where the edges of the pupil are detected, the pupil-center-detecting unit 115 executes detection processing for detecting the position of the center of the pupil in which importance is placed on the detection result of the outline of the pupil. On the other hand, in the case where the edges of the pupil are not detected, the pupil-center-detecting unit 115 executes detection processing for detecting the position of the center of the pupil in which importance is placed on the detection result of the outline of the iris.

Figure 9:
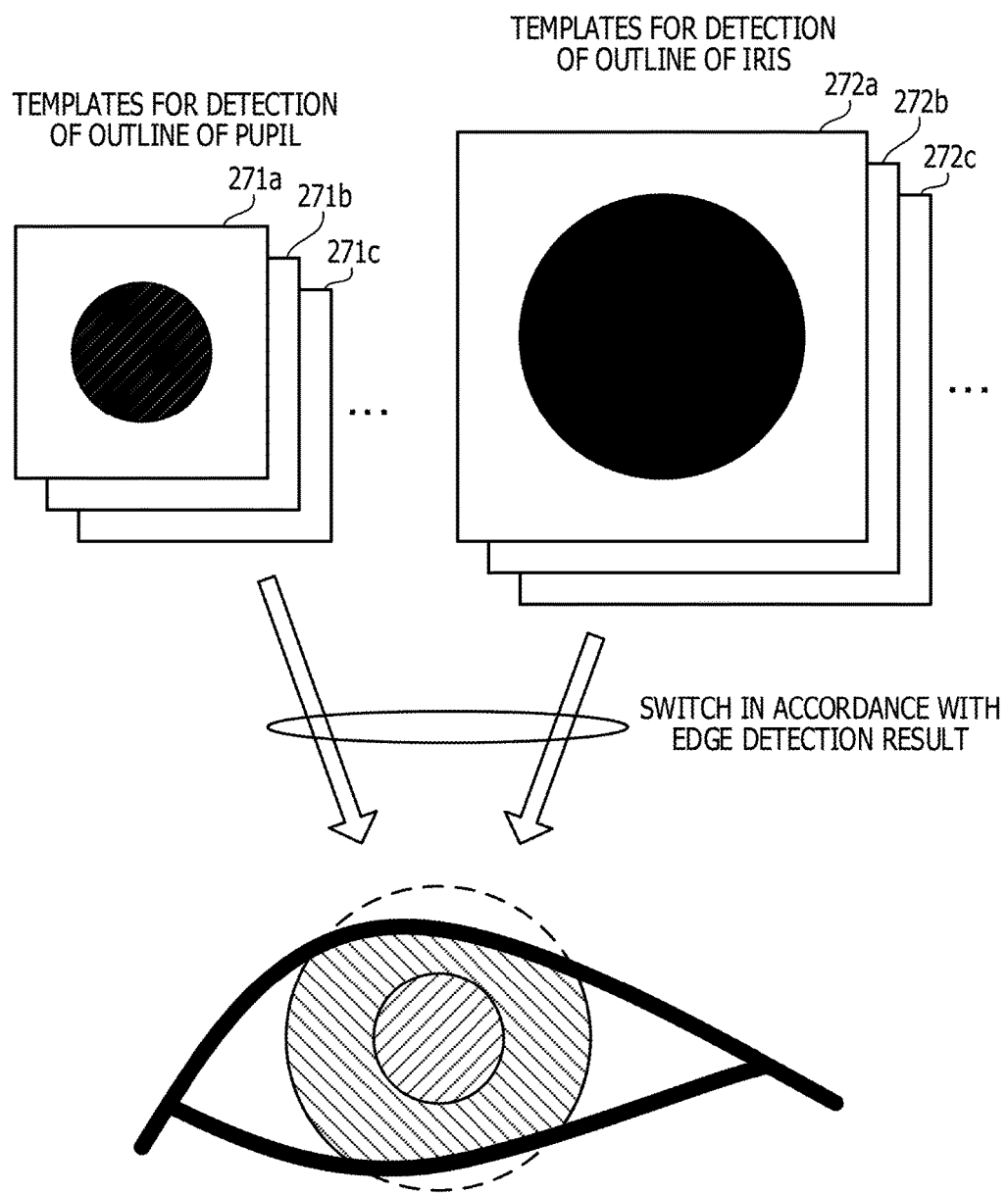
FIG. 9 illustrates an example of processing for detecting the position of the center of a pupil.

FIG. 9 illustrates an example of processing for detecting the position of the center of the pupil. In the processing of the pupil-center-detecting unit 115, for example, a plurality of templates 271a, 271b, 271c, . . . , which are for detecting the outline of the pupil, and a plurality of templates 272a, 272b, 272c, . . . , which are for detecting the outline of the iris, are used.

The templates 271a, 271b, 271c, . . . include circles of different radii that are suitable for the sizes of pupils in images. The pupil-center-detecting unit 115 detects the outline of the pupil by detecting a circle in a captured image by using the templates 271a, 271b, 271c, . . . .

On the other hand, the templates 272a, 272b, 272c, . . . include circles of different radii that are suitable for the sizes of irises in images. The largest value of the radii of circles included in the templates 272a, 272b, 272c, . . . is larger than the largest value of the radii of circles included in the templates 271a, 271b, 271c, . . . . The pupil-center-detecting unit 115 detects the outline of the iris by detecting a circle in a captured image by using the templates 272a, 272b, 272c, . . . .

The pupil-center-detecting unit 115 may use the templates after enlarging or shrinking the templates in accordance with the size of the face in the image and the distance between the eyes.

An example of a method of switching the detection processing to be used to detect the position of the center of the pupil in accordance with an edge detection result obtained by the edge-detecting unit 114 is a method in which either of processing in which the outline of the pupil is detected and the position of the center of the pupil is detected from that detection result and processing in which the outline of the iris is detected and the position of the center of the pupil is detected from this detection result is switched to and executed in accordance with the edge detection result obtained by the edge-detecting unit 114. Here, the former type of processing is called "center detection processing based on the pupil outline" and the latter type of processing is called "center detection processing based on the iris outline".

In the case where the edges of the pupil are detected by the edge-detecting unit 114, it is highly probable that the boundaries between the pupil and the iris are distinct and that the dark pupil state exists. Therefore, the pupil-center-detecting unit 115 executes the center detection processing based on the pupil outline. On the other hand, in the case where the edges of the pupil are not detected by the edge-detecting unit 114, it is highly probable that the boundaries between the pupil and the iris are not distinct and that the semi-bright pupil state exists. Therefore, the pupil-center-detecting unit 115 executes the center detection processing based on the iris outline. In the latter case, the boundaries between the iris and the sclera are more distinct than the boundaries between the pupil and the iris and therefore the position of the center of the pupil may be detected with higher accuracy by detecting the position of the center of the pupil based on the outline of the iris.

In the actual processing, not only the templates 271a, 271b, 271c, . . . , but also the templates 272a, 272b, 272c, . . . , which are for detecting the outline of the iris, may be used when detecting the outline of the pupil. For example, the outline of the pupil and the outline of the iris are detected with the following procedure.

First, in the case where the outline of the iris is to be detected, the pupil-center-detecting unit 115 obtains a maximum brightness Lmax and a minimum brightness Lmin in the eyeball region. The pupil-center-detecting unit 115 subjects the eyeball region to binarization processing while gradually reducing a threshold from the maximum brightness Lmax to the minimum brightness Lmin. Each time the threshold is reduced, the pupil-center-detecting unit 115 performs matching between the binarized image and the templates 272a, 272b, 272c, . . . , which are for detecting the outline of the iris, and determines whether a matching evaluation value (degree of similarity) between the binarized image and any of the templates exceeds a prescribed threshold.

Once the threshold falls below a certain brightness, a circular region, the outline of which is partially covered by the eyelids, appears in the eyeball region. At this time, it is determined that one of the templates 272a, 272b, 272c, . . . and the circular region that has appeared are similar to each other. Thus, the outline of the iris is detected. It is also possible to predict a circular region that corresponds to the outline of the iris from the distance between the eyes, for example.

On the other hand, in the case where the outline of the pupil is to be detected, the pupil-center-detecting unit 115 first detects the outline of the iris using the same method as described above. After that, the pupil-center-detecting unit 115 gradually reduces the threshold further and, each time the threshold is reduced, performs matching between the binarized image and the templates 271a, 271b, 271c, . . . , which are for detecting the outline of the pupil, and determines whether a matching evaluation value (degree of similarity) between the binarized image and any of the templates exceeds a prescribed threshold.

When the difference in brightness between the iris region and the pupil region is of a certain size, a circular region appears in the eyeball region, the outline of the circular region being completely exposed. At this time, it is determined that one of the templates 271a, 271b, 271c, . . . and the circular region that has appeared are similar to each other. Thus, the outline of the pupil is detected.

The outline of the iris is partially covered by the eyelids in most cases and it is rare for the entirety of the outline of the iris to be exposed in the eyeball region. Consequently, even when both the edges of the pupil and the edges of the iris are distinct, the accuracy of detection of the outline of the iris using the templates 272a, 272b, 272c, . . . will be lower than the accuracy of detection of the outline of the pupil using the templates 271a, 271b, 271c, . . . . This is the reason why the accuracy with which the position of the center of the pupil is detected is lower when the position of the center of the pupil is detected based on the outline of the iris than when the position of the center of the pupil is detected based on the outline of the pupil.

In the above-mentioned FIG. 9, an example is illustrated in which center detection processing based on the pupil outline and center detection processing based on the iris outline are switched between in accordance with an edge detection result obtained by the edge-detecting unit 114. However, the method of switching, in accordance with the edge detection result, the processing to be used is not limited to this example and a method in which a weight (likelihood) of a detection result of the outline of the pupil and a weight (likelihood) of a detection result of the outline of the iris are changed in accordance with the edge detection result may also be adopted, for example. In addition, a method may also be adopted in which control parameters of the center detection processing based on the pupil outline and the center detection processing based on the iris outline are changed in accordance with the edge detection result. These methods will be described in detail later.

Next, the processing performed by the line-of-sight detection device 100 will be described using a flowchart.

Figure 10:
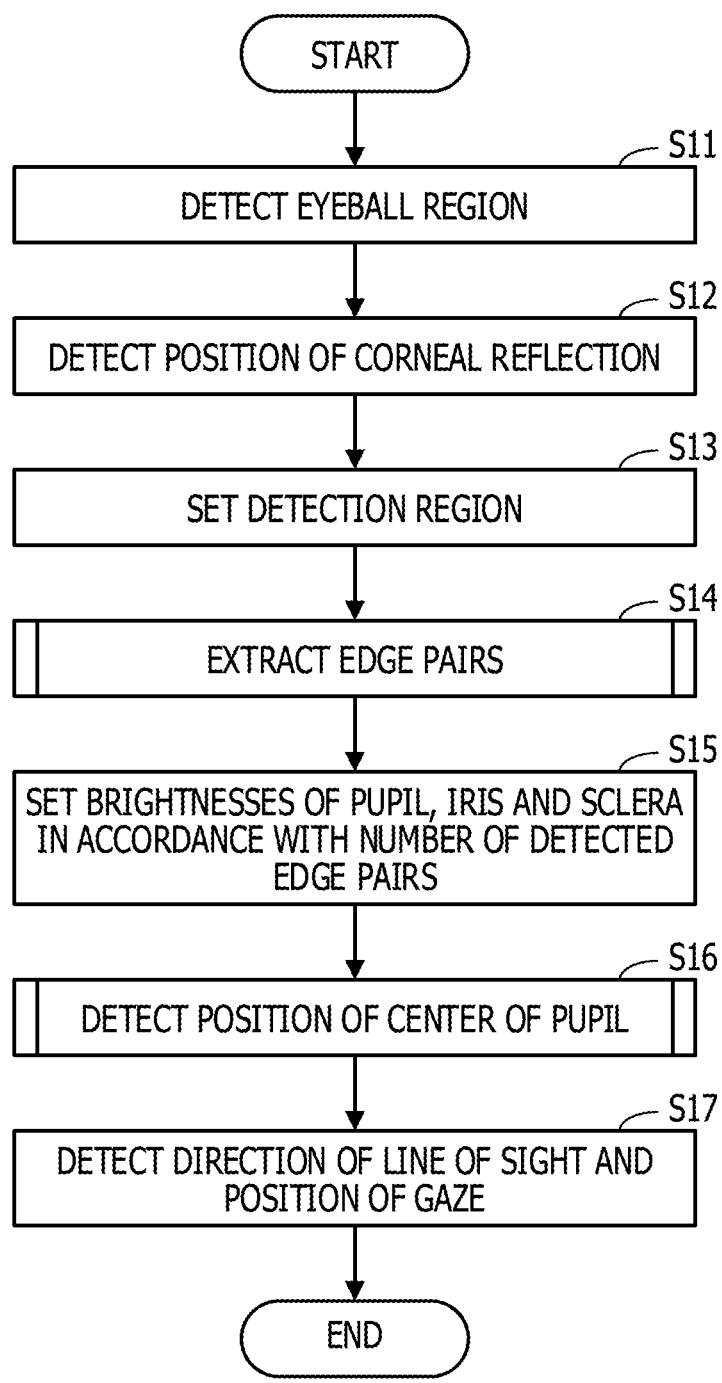
FIG. 10 is a flowchart that illustrates an example of the processing procedure of line-of-sight detection.

FIG. 10 is a flowchart that illustrates an example of the processing procedure of line-of-sight detection.

[Step S11] The image-obtaining unit 111 obtains an image in which the face of the user is captured by the infrared camera 107b. The eyeball-region-detecting unit 112 detects an eyeball region from the obtained image.

[Step S12] The corneal-reflection-detecting unit 113 detects the position of a corneal reflection from the eyeball region based on a brightness distribution of the eyeball region.

[Step S13] The edge-detecting unit 114 sets an edge detection region in the eyeball region.

[Step S14] The edge-detecting unit 114 detects edge portions by detecting differences in brightness from one end to the other end of the edge detection region. The edge-detecting unit 114 detects a pair of pupil edges (edge pair) and a pair of iris edges (edge pair). The processing of step S14 will be described in detail below.

[Step S15] The edge-detecting unit 114 sets the brightnesses of the pupil, the iris and the sclera in accordance with the number of edge pairs detected in step S14. The brightnesses set in step S15 are used in the processing of step S16.

In the case where two edge pairs are detected in step S14, both the edges of the pupil and the edges of the iris are detected. In this case, the edge-detecting unit 114 sets an average value of the brightnesses between the edges of the pupil in the edge detection region as the brightness of the pupil. In addition, the edge-detecting unit 114 sets an average value of the brightnesses between the edges of the pupil and the edges of the iris in the edge detection region as the brightness of the iris. Furthermore, the edge-detecting unit 114 sets the brightness of regions outside the edges of the iris in the edge detection region as the brightness of the sclera. The brightness of the sclera may be set to a preset value.

On the other hand, in the case where only one edge pair is detected in step S14, only the edges of the iris are detected. In this case, the edge-detecting unit 114 sets the brightness of the iris and the brightness of the sclera using the same method as described above. In addition, the edge-detecting unit 114 sets the brightness of the pupil to the same value as that set for the brightness of iris. Alternatively, the edge-detecting unit 114 sets the brightness close to the center of the region between the edges of the iris in the edge detection region as the brightness of the pupil.

[Step S16] The pupil-center-detecting unit 115 detects the position of the center of the pupil based on the brightnesses of the eyeball region. At this time, based on the detection result of edge pairs in step S14, the pupil-center-detecting unit 115 switches between and executes processing in which importance is placed upon the detection result of the outline of the pupil and processing in which importance is placed upon the detection result of the outline of the iris. The processing of step S16 will be described in detail below.

[Step S17] The line-of-sight-detecting unit 116 detects the line of sight direction of the user and the position of the gaze of the user based on the positional relationship between the position of the corneal reflection detected in step S12 and the position of the center of the pupil detected in step S16. Only one of the line of sight direction and the position of the gaze may be detected.

Next, a plurality of processing examples will be given for the processing of detecting edge pairs in step S14.

Figure 11:
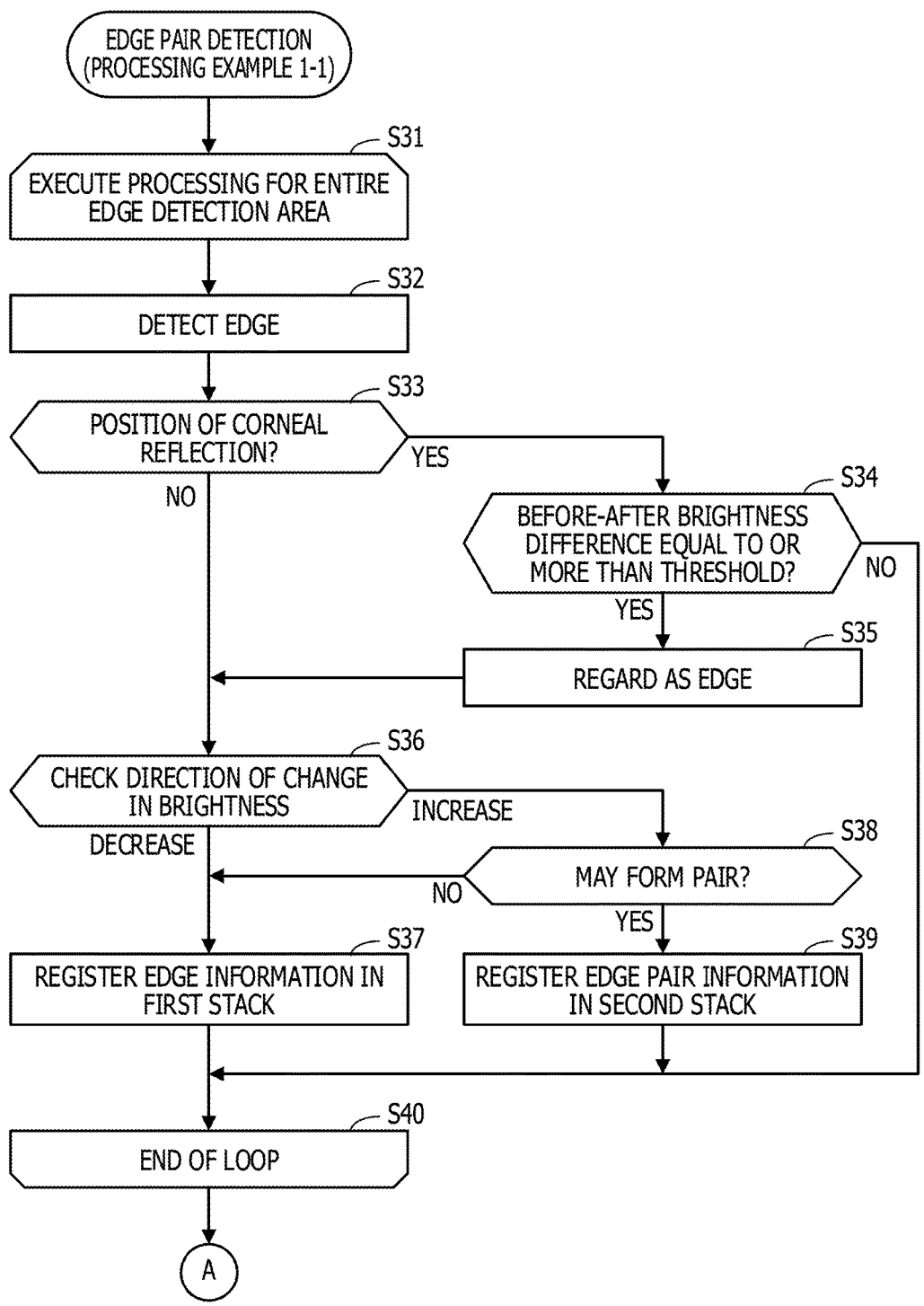
FIG. 11 is a flowchart (no. 1) that illustrates a processing example 1-1 of edge pair detection.
Figure 12:
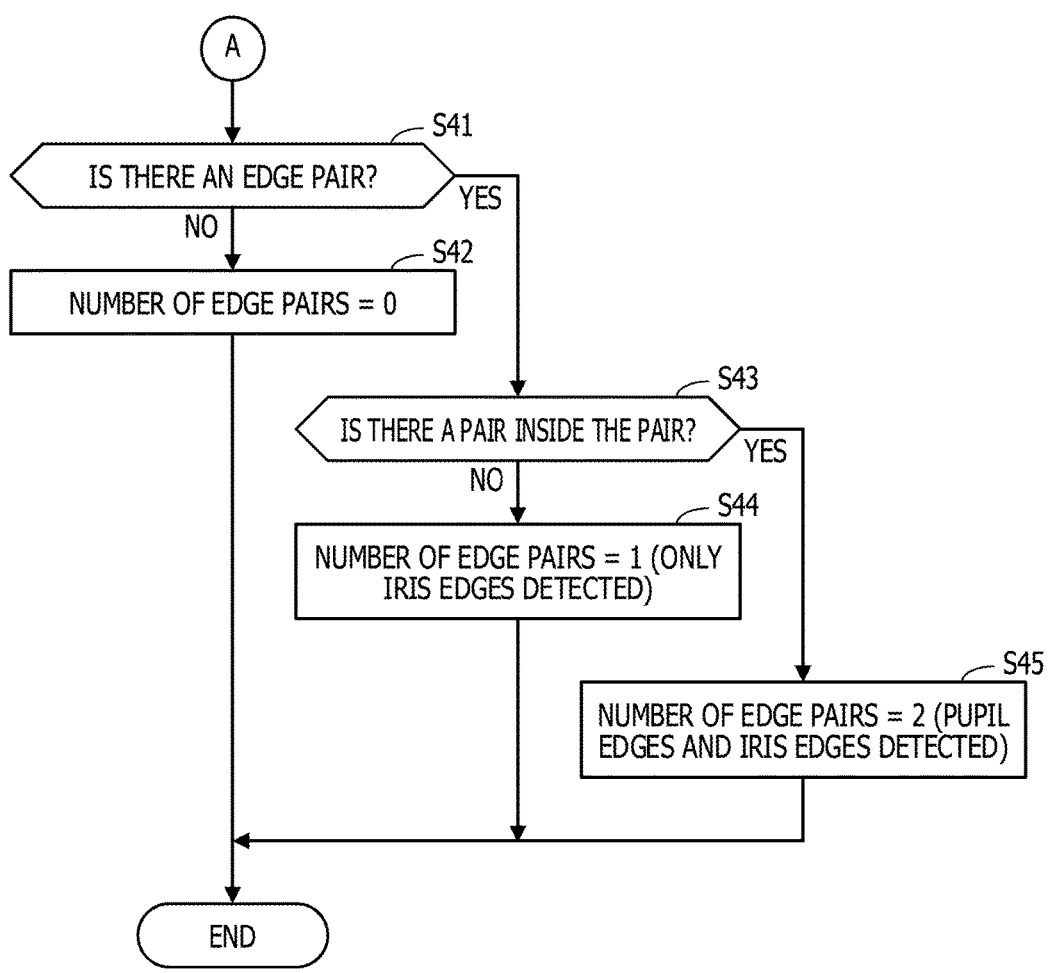
FIG. 12 is a flowchart (no. 2) that illustrates the processing example 1-1 of edge pair detection.

FIGS. 11 and 12 are flowcharts that illustrate a processing example 1-1 of edge pair detection. The processing in FIGS. 11 and 12 corresponds to the processing of step S14 in FIG. 10.

In addition, in the processing in FIGS. 11 and 12, a first stack in which edge information regarding edge portions is stored and a second stack in which edge pair information regarding edge pairs is stored are used. The first stack and the second stack are implemented as storage regions in the RAM 102 of the line-of-sight detection device 100, for example. Information is not stored in the first stack and the second stack when the processing of FIG. 11 is initiated.

[Step S31] The edge-detecting unit 114 executes the processing from step S31 up to the end of the loop in step S40 for the entire edge detection region from one end to the other end of the edge detection region.

[Step S32] The edge-detecting unit 114 sequentially executes processing of calculating differences in brightness toward the other end of the edge detection region, and upon detecting an edge portion, executes the processing of the subsequent step S33.

[Step S33] The edge-detecting unit 114 determines whether the position of a detected edge is the position of a corneal reflection. In the case where the position of the detected edge is the position of a corneal reflection, the processing of step S34 is executed and in the case where the position of the detected edge is not the position of a corneal reflection, the processing of step S36 is executed.

[Step S34] The edge-detecting unit 114 determines whether the difference in brightness between before and after the corneal reflection is equal to or higher than a prescribed threshold. In the case where the difference in brightness is equal to or higher than the threshold, the edge-detecting unit 114 determines that an edge exists in the region of a corneal reflection and the processing of step S35 is executed. On the other hand, in the case where the difference in brightness is less than the threshold, the edge-detecting unit 114 determines that an edge does not exist in the region of a corneal reflection and the processing of step S40 is executed. In the latter case, the region of the corneal reflection is regarded as a flat region in which an edge does not exist and the processing continues.

[Step S35] The edge-detecting unit 114 regards the region of the corneal reflection as an edge and executes the processing of step S36.

[Step S36] The edge-detecting unit 114 checks the direction of the change in brightness of the detected edge. In the case where the brightness changes in the direction of an increase, the processing of step S38 is executed, and in the case where the brightness changes in the direction of a decrease, the processing of step S37 is executed.

[Step S37] In the case where the brightness decreases between before and after the edge, it is assumed that the position of an edge on the advancement-direction side among edges of the pupil has not been reached. In this case, the edge-detecting unit 114 registers edge information regarding the detected edge in the first stack. The edge information includes the position of the detected edge and brightness values before and after the edge.

[Step S38] In the case where the brightness increases between before and after the edge, it is assumed that the position of the edge on the advancement-direction side among edges of the pupil has been reached or that that position has been passed. In this case, the edge-detecting unit 114 determines whether it is possible to make a pair with the detected edge and an edge out of the edges registered in the first stack.

In this determination, the edge-detecting unit 114 extracts, from among edges registered in the first stack, edges for which the direction of the change in brightness is opposite to that of the edge for which the direction of the change in brightness has been detected (that is, the direction of the change in brightness is the direction of a decrease). The edge-detecting unit 114 compares the edge information of the extracted edges and the edge information of the detected edge and specifies, among the extracted edges, that an edge that satisfies a prescribed number of one or two or more of the following conditions 1 to 3 is an edge that may form a pair with the detected edge.

(Condition 1) The difference between the brightness values on the high-brightness sides is less than a fixed value and the difference between the brightness values on the low-brightness sides is less than a fixed value, among the brightness values before and after the edges.

(Condition 2) The difference between the difference in brightness between before and after the extracted edge and the difference in brightness between before and after the detected edge is less than a fixed value.

(Condition 3) Suitable brightness ranges are stipulated in advance for the brightness values before and after an edge for the pupil edges and the iris edges and the brightness values before and after the extracted edge and the detected edge fall into the stipulated range for the pupil edges or the iris edges.

The edge-detecting unit 114 executes the processing of step S39 in the case where there is an edge that may form a pair. On the other hand, the edge-detecting unit 114 executes the processing of step S37 in the case where there is not an edge that may form a pair. In this case, in step S37, the edge information regarding the detected edge is registered in the first stack.

[Step S39] The edge-detecting unit 114 forms an edge pair out of the detected edge and the edge specified in step S38 and registers edge pair information regarding this edge pair in the second stack. The edge pair information includes the edge information of each of the edges and edge information regarding edges that exist singularly between the edges in the edge detection region. The latter edge information is edge information regarding edges that are not registered as part of an edge pair and is extracted from the first stack.

[Step S40] The edge-detecting unit 114 repeats execution of the processing from step S31 in the case where the search for edges up to the end of the edge detection region is not finished yet. On the other hand, the edge-detecting unit 114 executes the processing of step S41 in FIG. 12 in the case where the search for edges up to the end of the edge detection region is finished.

[Step S41] The edge-detecting unit 114 determines whether an edge pair is registered in the second stack. In the case where an edge pair is registered, the processing of step S43 is executed, and in the case where an edge pair is not registered, the processing of step S42 is executed.

[Step S42] The edge-detecting unit 114 notifies the pupil-center-detecting unit 115 that the number of detected edge pairs is 0. In this case, neither the edges of the pupil nor the edges of the iris have been detected by the edge-detecting unit 114 and there is a low probability that the pupil-center-detecting unit 115 will be able to normally detect the outline of the pupil and the outline of the iris. Consequently, the pupil-center-detecting unit 115 outputs the occurrence of a detection error to the display device 104a and so forth and finishes the line-of-sight detection processing.

[Step S43] The edge-detecting unit 114 determines whether there are two or more edge pairs registered in the second stack and whether both the edges included in one edge pair exist between the edges included in the other edge pair. In the case where this condition is satisfied, the processing of step S45 is executed, and in the case where this condition is not satisfied, the processing of step S44 is executed.

[Step S44] The edge-detecting unit 114 notifies the pupil-center-detecting unit 115 that the number of detected edge pairs is one. In addition, the edge-detecting unit 114 notifies the pupil-center-detecting unit 115 of the edge pair information of the one detected edge pair as information regarding the edges of the iris. In the case where a plurality of pieces of edge pair information are registered in the second stack, the edge-detecting unit 114 selects and notifies the pupil-center-detecting unit 115 of the edge pair information of the edge pair having the longest distance between the edges.

Upon receiving the above-described notifications, the pupil-center-detecting unit 115 determines that the edges of the iris have been detected but the edges of the pupil have not been detected by the edge-detecting unit 114. In step S15 of FIG. 10, the pupil-center-detecting unit 115 sets the brightness on the low-brightness side of the edges to the brightness of the iris and sets the brightness on the high-brightness side of the edges to the brightness of the sclera based on the brightness values for before and after the edges included in the notified edge pair information.

[Step S45] The edge-detecting unit 114 notifies the pupil-center-detecting unit 115 that the number of detected edge pairs is two. In addition, the edge-detecting unit 114 specifies two edge pairs that satisfy the condition of the determination of step S43. Among the edge pairs, the edge-detecting unit 114 notifies the pupil-center-detecting unit 115 of the edge pair information of the edge pair for which the distance between the edges is long as information regarding the edges of the iris and notifies the pupil-center-detecting unit 115 of the edge pair information of the edge pair for which the distance between the edges is short as information regarding the edges of the pupil.

Upon receiving the above-described notifications, the pupil-center-detecting unit 115 determines that both the edges of the pupil and the edges of the iris have been detected by the edge-detecting unit 114. In step S15 of FIG. 10, the pupil-center-detecting unit 115 sets the brightness on the low-brightness sides of the edges as the brightness of the pupil based on brightness values before and after the edges included in the edge pair information notified as the information regarding the edges of the pupil. In addition, the pupil-center-detecting unit 115 sets the brightness on the low-brightness side of the edges to the brightness of the iris and sets the brightness on the high-brightness side of the edges to the brightness of the sclera based on the brightness values for before and after the edges included in the edge pair information notified as the information regarding the edges of the iris.

In the above-described processing example 1-1, in the case where the processing of step S45 is executed, it is determined that the dark pupil state exists, and in the case where the processing of step S44 is executed, it is determined that the semi-bright pupil state exists. In the processing example 1-1, the line-of-sight detection device 100 is able to determine whether the semi-bright pupil state exists by searching for the edges of the pupil and the edges of the iris by detecting differences in brightness in the edge detection region.

Thus, for example, the detection accuracy may be improved compared with a method in which determination is made based on a result of estimating the distance from the infrared camera 107*b* to the face of the user. This is because, in addition to the accuracy with which the distance from the infrared camera 107*b* to the face of the user is estimated being low, it is possible to determine whether the semi-bright pupil state exists regardless of individual differences in brightness between irises.

The reflectance, transmittance and absorption of infrared light in the iris chiefly depend on the amount of melanin contained in the iris and there are individual differences in the amount of melanin contained in irises. Therefore, there are individual differences in brightness between irises. Consequently, even if the distance between the infrared light 107*a* and the infrared camera 107*b* remains the same, the difference in brightness between the pupil and the iris and the difference in brightness between the iris and the sclera vary from person to person. With the processing example 1-1 described above, even if there are individual differences between the difference in brightness between a pupil and an iris and the difference in brightness between an iris and a sclera, a determination may be made as to whether the semi-bright pupil state exists.

Figure 13:
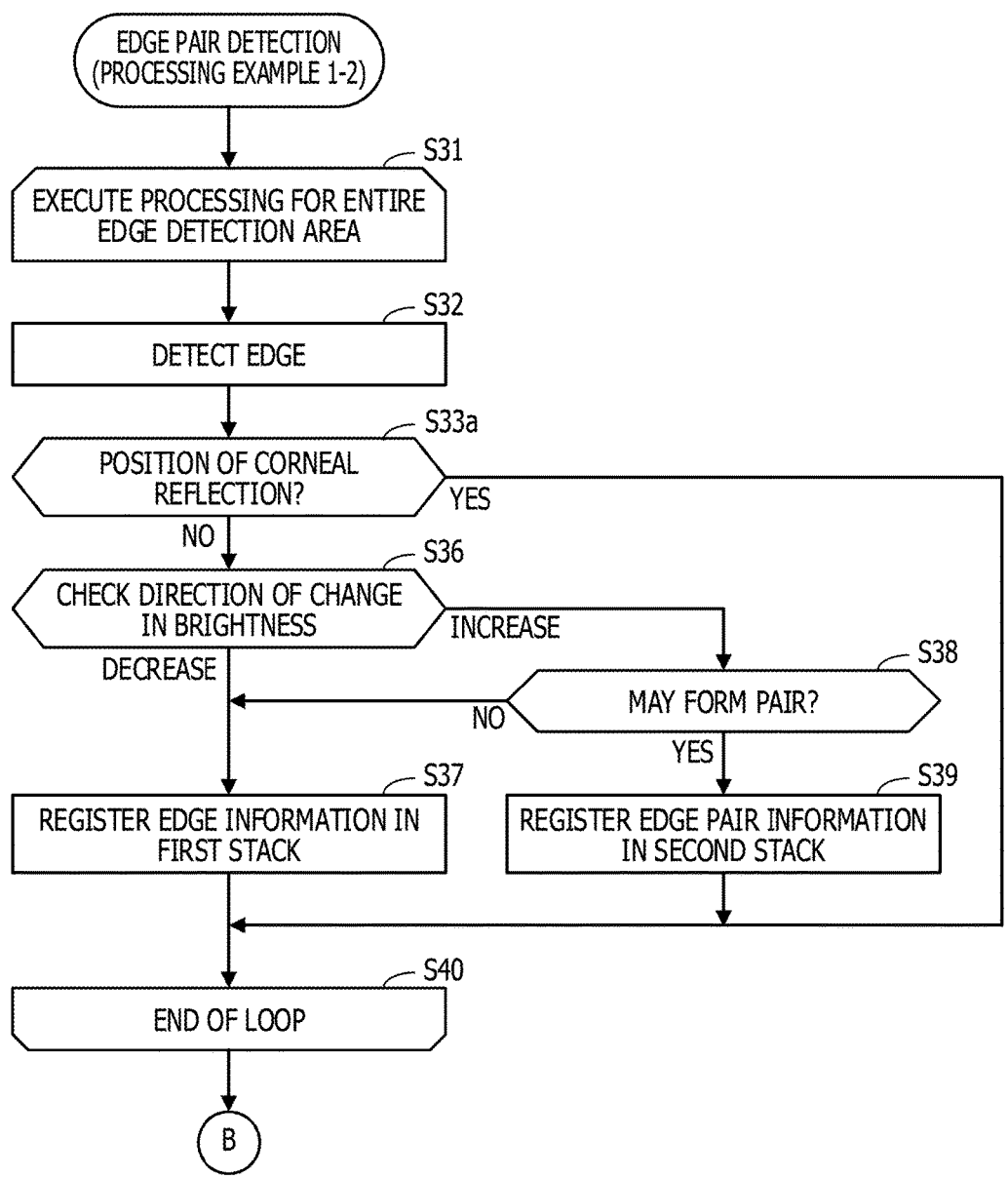
FIG. 13 is a flowchart (no. 1) that illustrates a processing example 1-2 of edge pair detection.
Figure 14:
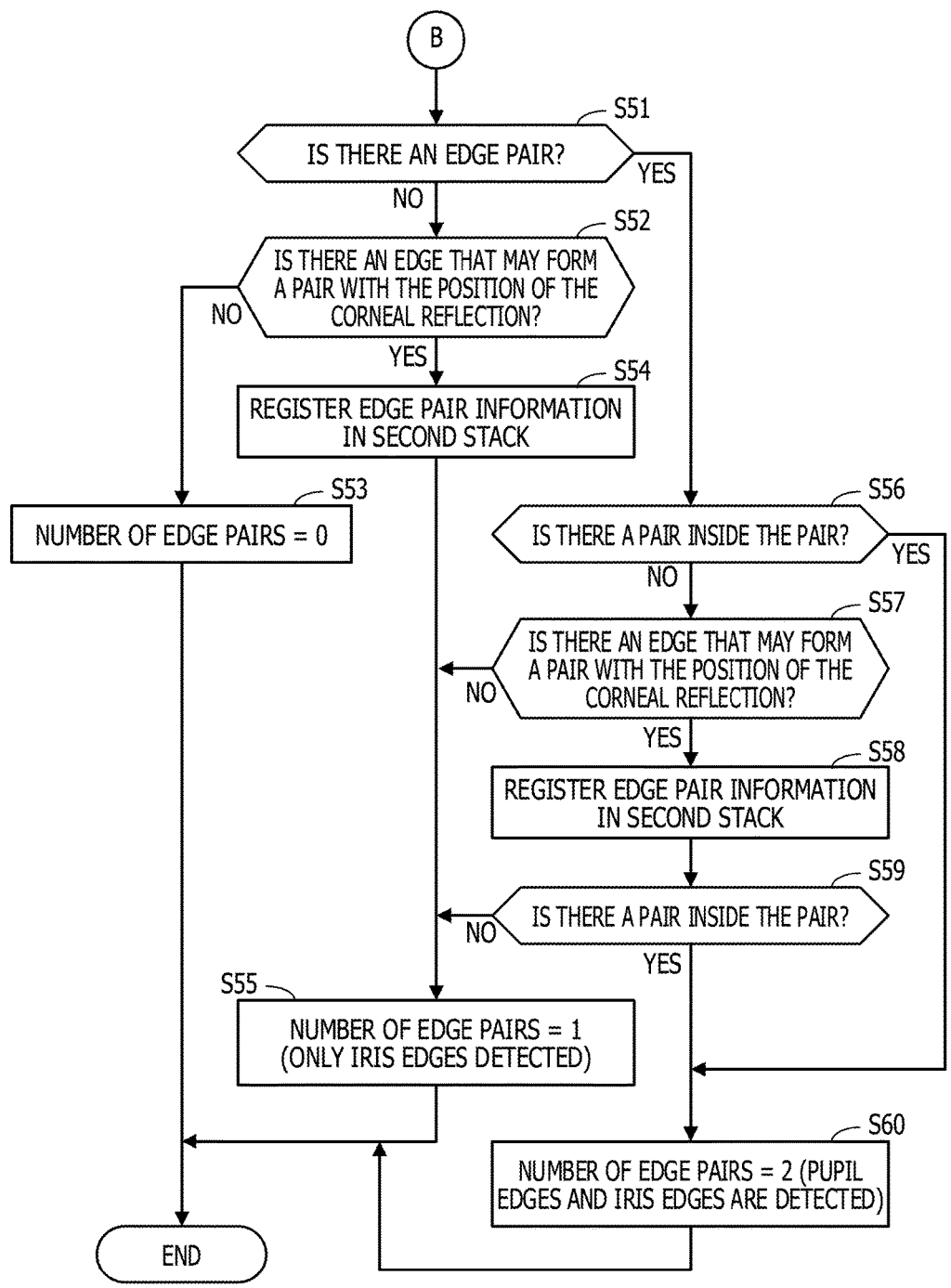
FIG. 14 is a flowchart (no. 2) that illustrates the processing example 1-2 of edge pair detection.

Next, FIGS. 13 and 14 are flowcharts that illustrate a processing example 1-2 of edge pair detection. The processing in FIGS. 13 and 14 corresponds to the processing of step S14 in FIG. 10.

This processing example 1-2 differs from the processing example 1-1 in that a determination is made as to whether the region of a corneal reflection is to be regarded as an edge based on the positional relationship between the corneal reflection and another detected edge in the case where there is a corneal reflection in the edge detection region. In the processing example 1-2, first, the processing of steps S33 to S35 out of the processing illustrated in FIG. 11 is replaced with processing of step S33*a* as illustrated in FIG. 13.

[Step S33*a*] The edge-detecting unit 114 determines whether the position of a detected edge is the position of a corneal reflection. In the case where the position of the detected edge is the position of a corneal reflection, the processing of step S40 is executed. In this case, determination as to whether the position of the corneal reflection is to be regarded as an edge is performed in the processing of FIG. 14. On the other hand, in the case where the position of the detected edge is not the position of a corneal reflection, the processing of step S36 is executed.

In addition, the following processing illustrated in FIG. 14 is executed after execution of the processing illustrated in FIG. 13.

[Step S51] The edge-detecting unit 114 determines whether an edge pair is registered in the second stack. In the case where an edge pair is registered, the processing of step S56 is executed, and in the case where an edge pair is not registered, the processing of step S52 is executed.

[Step S52] When the edge-detecting unit 114 regards the position of the corneal reflection as an edge in the case where there is a corneal reflection in the edge detection region, the edge-detecting unit 114 determines whether there is an another edge that may form a pair with that edge.

For example, a suitable brightness range for the brightness values before and after an iris edge and a suitable distance range for the distance between iris edges are stipulated in advance. The edge-detecting unit 114 extracts an edge for which the brightness values before and after the edge fall within the stipulated brightness range from among edges registered in the first stack. In addition, the edge-detecting unit 114 determines whether the distance between the extracted edge and the corneal reflection falls within the stipulated distance range. In the case where the distance does fall within the stipulated range, the edge-detecting unit 114 determines that an iris edge exists at the position of the corneal reflection. In this case, when the position of the corneal reflection is regarded as an edge, it is determined that this edge and the extracted edge may form a pair.

In the case where it is determined that there is an edge that may form a pair, the processing of step S54 is executed, and in the case where it is determined that there is not an edge that may form a pair, the processing of step S53 is executed. In the case where a corneal reflection does not exist in the edge detection region, the processing of step S53 is executed unconditionally.

[Step S53] The edge-detecting unit 114 notifies the pupil-center-detecting unit 115 that the number of detected edge pairs is zero, similarly to as in step S42 of FIG. 12.

[Step S54] The edge-detecting unit 114 regards the position of the corneal reflection as an edge and registers, in the second stack, edge pair information including information regarding this edge and edge information regarding the edge extracted as an edge capable of forming a pair in step S52.

[Step S55] The same processing as in step S44 of FIG. 12 is executed. That is, the edge-detecting unit 114 notifies the pupil-center-detecting unit 115 that the number of detected edge pairs is one. In addition, the edge-detecting unit 114 notifies the pupil-center-detecting unit 115 of the edge pair information of the one detected edge pair as information regarding the edges of the iris.

[Step S56] The edge-detecting unit 114 determines whether there are two or more edge pairs registered in the second stack and whether both the edges included in one edge pair exist between the edges included in the other edge pair. In the case where this condition is satisfied, the processing of step S60 is executed, and in the case where this condition is not satisfied, the processing of step S57 is executed.

[Step S57] When the edge-detecting unit 114 regards the position of the corneal reflection as an edge in the case where there is a corneal reflection in the edge detection region, the edge-detecting unit 114 determines whether there is an another edge that may form a pair with that edge.

For example, in the case where the corneal reflection and an edge that is registered in the first stack but is not part of a pair (hereafter, referred to as "inner edge") are included between one edge pair registered in the second stack, the edge-detecting unit 114 executes the following processing. The edge-detecting unit 114 calculates the distance between the one edge that is closer to the inner edge, among the edges included in the edge pair, and the inner edge (first distance). In addition, the edge-detecting unit 114 calculates the distance between the other edge included in the edge pair and the corneal reflection (second distance).

The edge-detecting unit 114 determines that a pupil edge exists at the position of the corneal reflection in the case where the first distance and the second distance are equal to or less than prescribed thresholds, the difference between the brightness values on the high-brightness side is less than a fixed value and the difference between the brightness values on the low-brightness side is less than a fixed value, among the brightness values before and after the inner edge and the corneal reflection. In this case, when the position of the corneal reflection is regarded as an edge, it is determined that this edge and the inner edge may form a pair.

In addition, for example, in the case where the corneal reflection exists on one side and an edge, which is registered in the first stack but is not part of a pair, (hereafter, referred to as "outer edge") exists on the other side of a region between edges included in one edge pair that is registered in the second stack, the edge-detecting unit 114 executes the following processing. The edge-detecting unit 114 calculates the distance between the one edge that is closer to the outer edge, among the edges included in the edge pair, and the outer edge (third distance). In addition, the edge-detecting unit 114 calculates the distance between the other edge included in the edge pair and the corneal reflection (fourth distance).

The edge-detecting unit 114 determines that an iris edge exists at the position of the corneal reflection in the case where the third distance and the fourth distance are equal to or less than prescribed thresholds, and the difference between the brightness values on the high-brightness side is less than a fixed value and the difference between the brightness values on the low-brightness side is less than a fixed value, among the brightness values before and after the outer edge and the corneal reflection. In this case, when the position of the corneal reflection is regarded as an edge, it is determined that this edge and the outer edge may form a pair.

In the case where it is determined that there is an edge that may form a pair, the processing of step S58 is executed, and in the case where it is determined that there is not an edge that may form a pair, the processing of step S55 is executed. In the case where a corneal reflection does not exist in the edge detection region, the processing of step S55 is executed unconditionally.

[Step S58] The edge-detecting unit 114 regards the position of the corneal reflection as an edge and registers, in the second stack, edge pair information including information regarding this edge and edge information regarding the edge extracted as an edge capable of forming a pair in step S57.

[Step S59] In this state, two or more edge pairs are registered in the second stack. The edge-detecting unit 114 determines whether both the edges included in one edge pair exist between the edges included in the other edge pair among the edge pairs registered in the second stack. In the case where this condition is satisfied, the processing of step S60 is executed, and in the case where this condition is not satisfied, the processing of step S55 is executed.

[Step S60] The edge-detecting unit 114 notifies the pupil-center-detecting unit 115 that the number of detected edge pairs is two, similarly to as in step S45 of FIG. 12. In addition, the edge-detecting unit 114 specifies two edge pairs that satisfy the condition of the determination of step S56 or step S59. Among the edge pairs, the edge-detecting unit 114 notifies the pupil-center-detecting unit 115 of the edge pair information of the edge pair for which the distance between the edges is long as information regarding the edges of the iris and notifies the pupil-center-detecting unit 115 of the edge pair information of the edge pair for which the distance between the edges is short as information regarding the edges of the pupil.

According to the above-described processing example 1-2, a determination is made as to whether to regard the corneal reflection as an edge based on the positional relationship between the detected edges and the corneal reflection, and as a result, even in a case where the corneal reflection and a pupil edge or an iris edge overlap each other, the existence of an edge in the overlapping part may be more accurately discriminated compared with the processing example 1-1. As a result, it is possible to improve the accuracy with which it is determined whether the semi-bright pupil state exists.

In the processing examples 1-1 and 1-2, the iris edges are detected by utilizing the fact that the sclera is visible on both sides of the iris in the eyeball region. However, in the case where the eyeball is turned to the side, only one of sclera regions between which the iris is interposed may be visible in the eyeball region. In the case where only one edge pair is detected, it is possible that the detected edge pair are the edges of the pupil when the eyeball is turned to the side. Thus, in the case where only one edge pair is detected, it may not be possible to tell whether the edge pair are the edges of the iris or the edges of the pupil.

In response to this, the edge-detecting unit 114 may set the brightnesses of the pupil, iris, and sclera using the following method in step S15 of FIG. 10 in the case where only one edge pair is detected.

The edge-detecting unit 114 detects edge lines (outlines), which include edges that form pairs, from the eyeball region. The edge-detecting unit 114 fills an inner region enclosed between detected edge lines with the brightness in the vicinity of the edge lines of the inner region.

When the filled region is circular, the edge-detecting unit 114 may determine that the region is the pupil and that the selected edge is a pupil edge. In this case, the edge-detecting unit 114 sets the brightness on the low-brightness side of the selected edge to the brightness of the pupil and sets the brightness on the high-brightness side of the selected edge to the brightness of the iris. In addition, the edge-detecting unit 114 scans the edge detection region from an edge of the pupil to outside the pupil and may determine a position where the brightness increases by a prescribed value or more to be an iris edge. In this case, the brightness outside the determined iris edge is set to the brightness of the sclera.

On the other hand, in the case where the filled region is not circular (for example, is a shape that is convex on the right or left side and the top and/or bottom of a circular shape thereof is covered by an eyelid), it is highly probable that the semi-bright pupil state exists and this region is the iris. In this case, the edge-detecting unit 114 sets the brightness of the inner region inside the edge line to the brightness of the iris and sets the brightness of the outer region outside the edge line to the brightness of the sclera. In addition, the brightness of the pupil is set to the same value as the brightness of the iris.

Next, a plurality of processing examples will be given for the processing of detecting the position of the center of the pupil in step S16 of FIG. 10.

Figure 15:
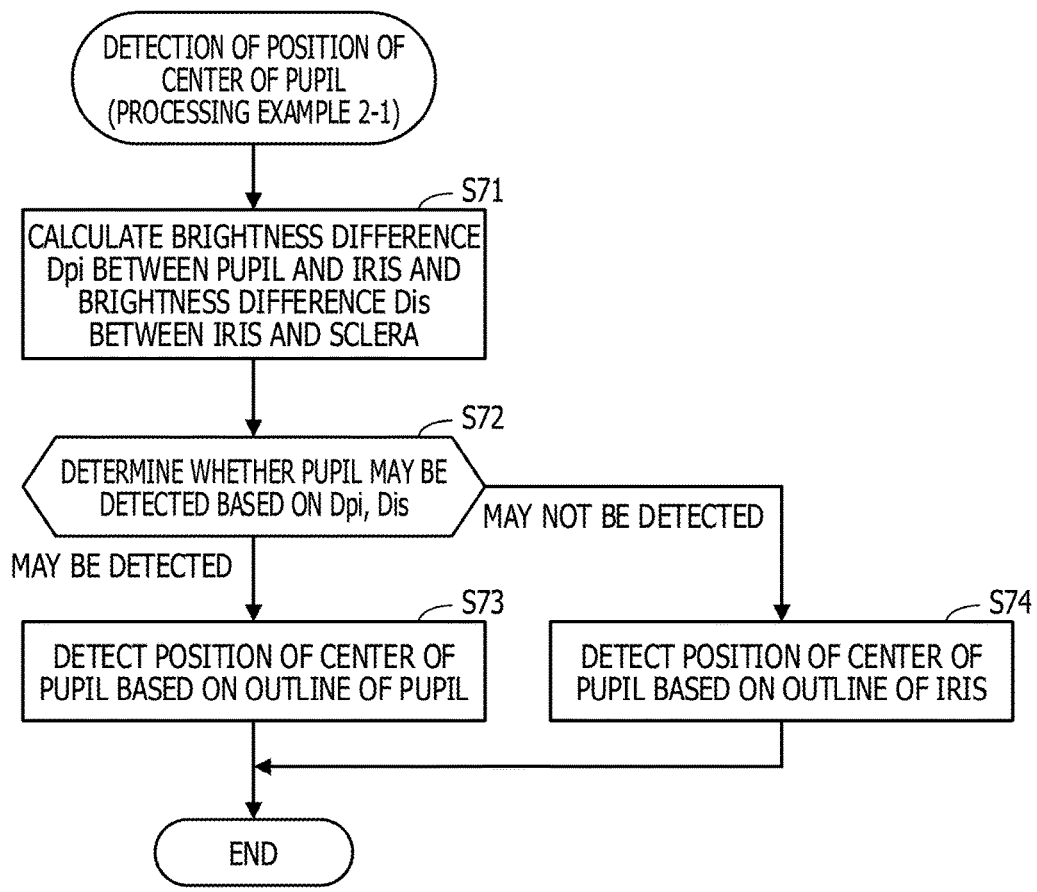
FIG. 15 is a flowchart that illustrates a processing example 2-1 of processing of detecting the position of the center of a pupil.

FIG. 15 is a flowchart that illustrates a processing example 2-1 of processing of detecting the position of the center of a pupil. The processing in FIG. 15 corresponds to the processing of step S16 in FIG. 10.

[Step S71] The pupil-center-detecting unit 115 calculates a brightness difference Dpi between the pupil and the iris and a brightness difference Dis between the iris and the sclera based on the brightnesses of the pupil, the iris and the sclera notified from the edge-detecting unit 114 in step S15 of FIG. 10.

[Step S72] The pupil-center-detecting unit 115 determines whether a state exists where the outline of the pupil may be accurately detected, that is, whether the dark pupil state exists, based on the brightness differences Dpi and Dis. For example, the pupil-center-detecting unit 115 determines that a state in which the outline of the pupil may be accurately detected does exist when an expression Dpi>Dis−A is satisfied. A is a prescribed bias value and is set to a value greater than 0.

In the case where a state exists where the outline of the pupil may be accurately detected, the processing of step S73 is executed, and otherwise, the processing of step S74 is executed.

In step S72, it is determined that the brightness difference Dpi is 0 and a state in which the outline of the pupil may be accurately detected does not exist when the edges of the pupil are not detected by the edge-detecting unit 114. In addition, even in the case where the edges of the pupil are detected by the edge-detecting unit 114, it is determined that a state in which the outline of the pupil may be accurately detected does not exist when the brightness difference Dpi between the pupil and the iris is not sufficiently larger than the brightness difference Dis between the iris and the sclera.

[Step S73] The pupil-center-detecting unit 115 detects the outline of the pupil from the eyeball region by using pupil outline detection templates. The pupil-center-detecting unit 115 detects the position of the center of the pupil based on the detected outline of the pupil.

[Step S74] The pupil-center-detecting unit 115 detects the outline of the iris from the eyeball region by using iris outline detection templates. The pupil-center-detecting unit 115 detects the position of the center of the pupil based on the detected outline of the iris.

In the above-described processing example 2-1, processing in which the position of the center of the pupil is detected based on the outline of the pupil and processing in which the position of the center of the pupil is detected based on the outline of the iris are switched between in accordance with the brightness differences Dpi and Dis based on a detection result of the edge-detecting unit 114.

In step S72, for example, in the case where the edges of the pupil are detected by the edge-detecting unit 114, the processing of step S73 may be executed, and in the case where the edges of the pupil are not detected by the edge-detecting unit 114, the processing of step S74 may be executed.

Figure 16:
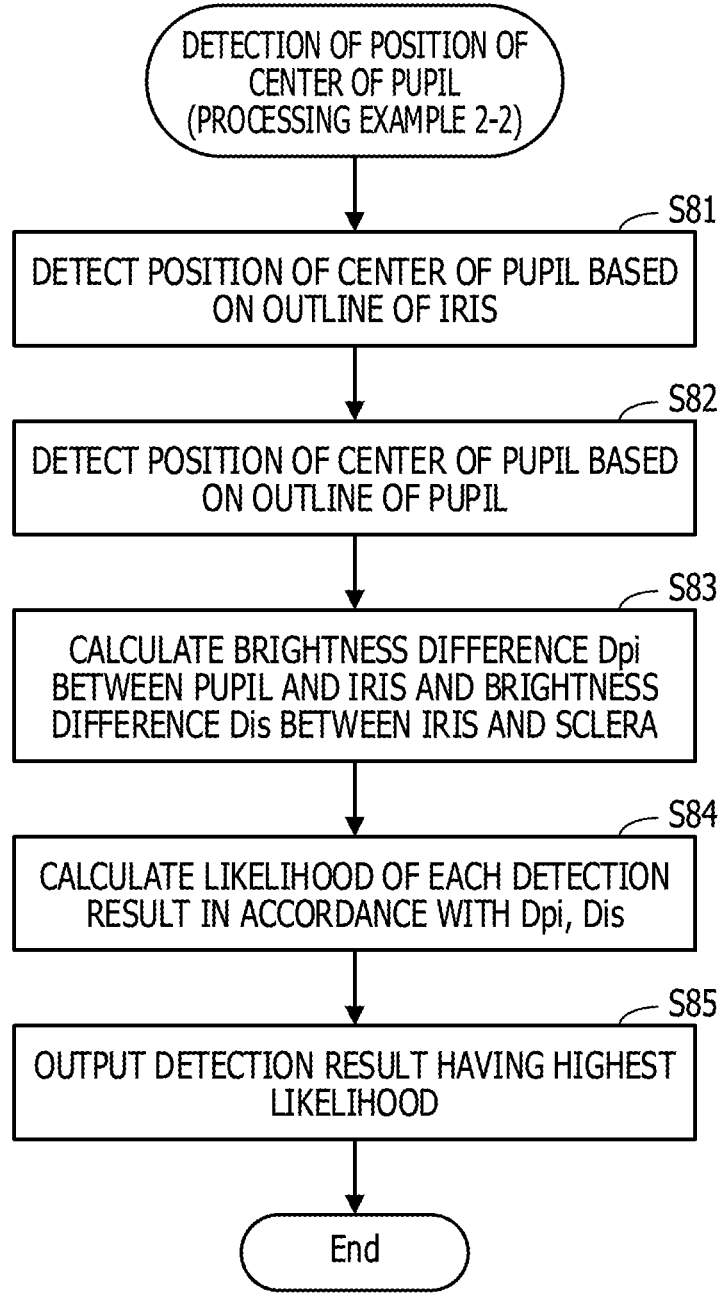
FIG. 16 is a flowchart that illustrates a processing example 2-2 of processing of detecting the position of the center of a pupil.

FIG. 16 is a flowchart that illustrates a processing example 2-2 of processing of detecting the position of the center of a pupil. The processing in FIG. 16 corresponds to the processing of step S16 in FIG. 10.

[Step S81] The pupil-center-detecting unit 115 detects the outline of the iris from the eyeball region by using iris outline detection templates. The pupil-center-detecting unit 115 detects the position of the center of the pupil based on the detected outline of the iris.

[Step S82] The pupil-center-detecting unit 115 detects the outline of the pupil from the eyeball region by using pupil outline detection templates. The pupil-center-detecting unit 115 detects the position of the center of the pupil based on the detected outline of the pupil.

[Step S83] The pupil-center-detecting unit 115 calculates a brightness difference Dpi between the pupil and the iris and a brightness difference Dis between the iris and the sclera based on the brightnesses of the pupil, the iris and the sclera notified from the edge-detecting unit 114 in step S15 of FIG. 10.

[Step S84] The pupil-center-detecting unit 115 calculates a likelihood for each of the detection results of steps S81 and S82. For example, the pupil-center-detecting unit 115 calculates likelihoods for the detection results based on matching evaluation values between the image and the templates when the outlines of the iris and the pupil are detected in steps S81 and S82 and likelihoods given in advance to the templates used when detecting outlines. The matching evaluation values between the image and the templates are, for example, calculated based on the degree of agreement between the image and the templates and the difference between an average brightness inside the detected outlines and a predetermined brightness.

Furthermore, the pupil-center-detecting unit 115 weights the likelihoods in accordance with the brightness differences Dpi and Dis. At this time, the pupil-center-detecting unit 115, for example, increases the weight of the likelihood of the detection result obtained in step S82, the larger the brightness difference Dpi becomes compared to the brightness difference Dis. The ratio between the brightness difference Dis and the brightness difference Dpi used in this determination represents whether the edges of the pupil have been detected as a continuous evaluation value and this evaluation value represents to what degree of accuracy the outline of the pupil may be detected.

[Step S85] The pupil-center-detecting unit 115 outputs the detection result having the higher likelihood, from among the detection results of steps S81 and S82, as a final detection result. In step S85, each detection result may be output together with the likelihood.

In the above-described processing example 2-2, the likelihoods of a detection result of the position of the center of the pupil based on the outline of the pupil and a detection result of the position of the center of the pupil based on the outline of the iris are weighted in accordance with the brightness differences Dpi and Dis based on a detection result of the edge-detecting unit 114.

Next, a processing example 2-3 of processing of detecting the position of the center of the pupil will be described.

First, FIG. 17 illustrates an example of the relationship between templates and likelihood. Likelihoods are assigned in advance to the pupil outline detection templates for every radius of circle included in the templates. The curve of a function Rpupil illustrated in graph 281 of FIG. 17 illustrates the relationship between the radii of circles included the pupil outline detection templates and likelihood. For example, when the outline of the pupil is detected by determining that the image of the eyeball region and a certain template are similar to each other, the likelihood assigned to the used template represents the reliability of the detection result of this outline.

In addition, likelihoods are similarly assigned in advance to the iris outline detection templates for every radius of circle included in the templates. The curve of a function Riris illustrated in graph 281 of FIG. 17 illustrates the relationship between the radii of circles included the iris outline detection templates and likelihood. Since pupils have smaller radii than irises, the likelihood is set to be higher for the pupil outline detection templates in the range of a small circle radius, as illustrated in graph 281.

The pupil-center-detecting unit 115 weights the function Rpupil and the function Riris in accordance with a function f(W) calculated from the brightness differences Dpi and Dis based on the detection result of the edge-detecting unit 114, for example. Graph 282 of FIG. 17 illustrates the curves of the function Rpupil and the function Riris after having been weighted with the function f(W). The function f(W) increases the weight of the function Rpupil and decreases the weight of the function Riris, the larger the brightness difference Dpi becomes compared to the brightness difference Dis, for example. The graph 282 is an example for a case in which the edges of the pupil are not detected by the edge-detecting unit 114 and the brightness difference Dpi is smaller than the brightness difference Dis, and the largest output of the function Riris is larger than the largest output of the function Rpupil. In this case, the detection result of the position of the center of the pupil based on the outline of the iris has a higher likelihood than the detection result of the position of the center of the pupil based on the outline of the pupil.

In addition, based on the function Rpupil and the function Riris after the functions have been weighted, the pupil-center-detecting unit 115 may restrict what templates are used in detection of the outlines. For example, the pupil-center-detecting unit 115 compares the output values of the function Rpupil and the function Riris after weighting and a prescribed threshold Th. Based on the function Rpupil, the pupil-center-detecting unit 115 detects the outline of the pupil by using just the templates having a higher likelihood than the threshold Th, among the pupil outline detection templates. In addition, based on the function Riris, the pupil-center-detecting unit 115 detects the outline of the iris by using just the templates having a higher likelihood than the threshold Th, among the iris outline detection templates.

With this processing, in the case where the edges of the pupil are detected by the edge-detecting unit 114, outline detection is performed using relatively more pupil outline detection templates than iris outline detection templates. On the other hand, in the case where the edges of the pupil are not detected by the edge-detecting unit 114, outline detection is performed using relatively more iris outline detection templates than pupil outline detection templates. In the example of graph 282, the largest output of the function Rpupil is equal to or less than the threshold Th and therefore, substantially, only detection of the outline of the iris is performed and detection of the outline of the pupil is not performed.

Figure 18:
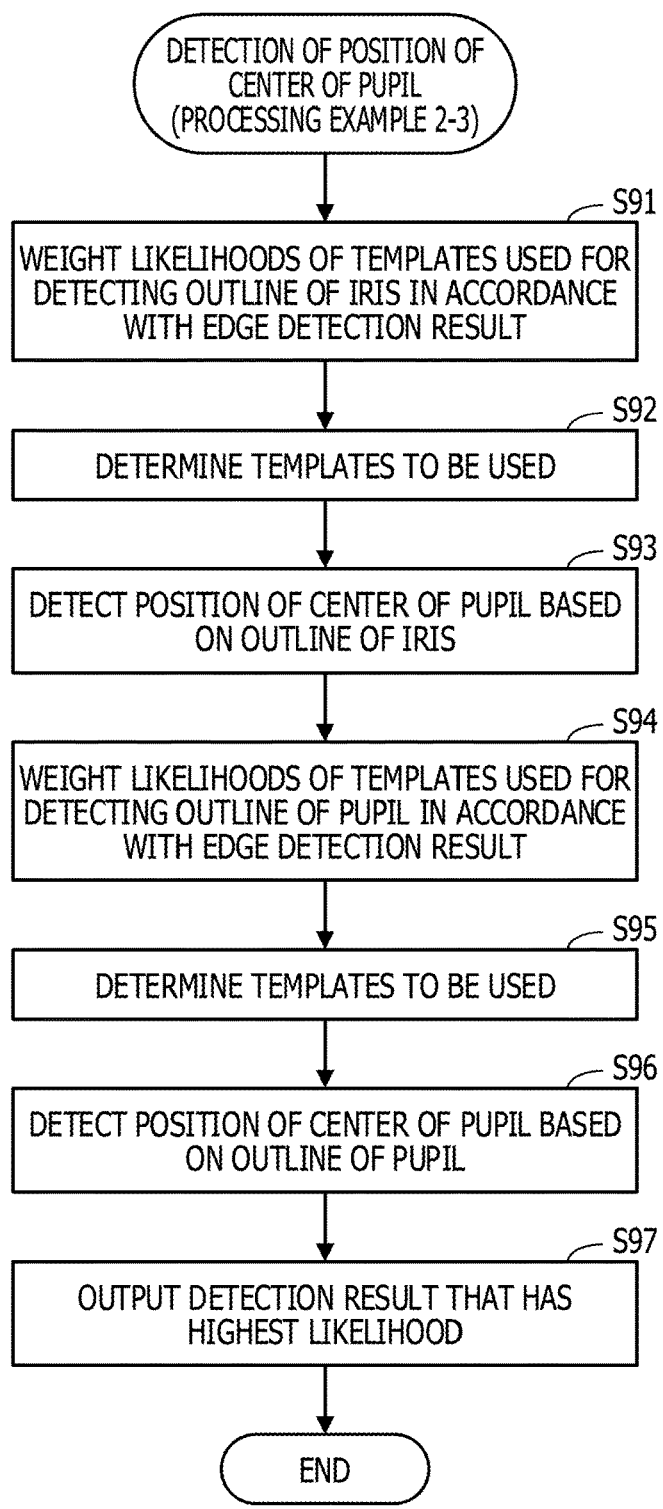
FIG. 18 is a flowchart that illustrates a processing example 2-3 of processing of detecting the position of the center of the pupil.

FIG. 18 is a flowchart that illustrates a processing example 2-3 of processing of detecting the position of the center of the pupil. The processing in FIG. 18 corresponds to the processing of step S16 in FIG. 10.

In FIG. 18, a case is illustrated in which the templates to be used in outline detection are restricted based on the function Rpupil and the function Riris after the functions have been weighted.

[Step S91] In accordance with the edge detection result obtained by the edge-detecting unit 114, the pupil-center-detecting unit 115 weights the likelihoods assigned in advance to the templates used to detect the outline of the iris. For example, the pupil-center-detecting unit 115 makes a weight smaller, the larger the brightness difference Dpi is compared to the brightness difference Dis.

[Step S92] The pupil-center-detecting unit 115 determines that templates for which the likelihood after the weighting in step S91 is larger than a threshold Th are templates to be used in outline detection from among the iris outline detection templates.

[Step S93] The pupil-center-detecting unit 115 detects the outline of the iris from the eyeball region by using the templates determined in step S92. The pupil-center-detecting unit 115 detects the position of the center of the pupil based on the detected outline of the iris.

[Step S94] In accordance with the edge detection result obtained by the edge-detecting unit 114, the pupil-center-detecting unit 115 weights the likelihoods assigned in advance to the templates used to detect the outline of the pupil. For example, the pupil-center-detecting unit 115 makes the weight larger, the larger the brightness difference Dpi is compared to the brightness difference Dis.

[Step S95] The pupil-center-detecting unit 115 determines that templates for which the likelihood after the weighting in step S94 is larger than the threshold Th are templates to be used in outline detection from among the pupil outline detection templates.

[Step S96] The pupil-center-detecting unit 115 detects the outline of the pupil from the eyeball region by using the templates determined in step S95. The pupil-center-detecting unit 115 detects the position of the center of the pupil based on the detected outline of the pupil.

[Step S97] The pupil-center-detecting unit 115 calculates a likelihood for each of the detection results of steps S93 and S96. For example, the pupil-center-detecting unit 115 calculates likelihoods for the detection results based on matching evaluation values between the image and the templates when the outlines of the iris and the pupil are detected in steps S93 and S96 and likelihoods given in advance to templates used when detecting the outlines. The likelihoods weighted in steps S91 and S94 are used as the likelihoods to be given to the templates.

The pupil-center-detecting unit 115 outputs the detection result having the higher likelihood, from among the detection results of steps S93 and S96, as a final detection result. In step S97, each detection result may be output together with the likelihood.

With the processing of FIG. 18 described above, the likelihoods assigned to the templates are adjusted in accordance with the detection result of the edge-detecting unit 114. The templates used when detecting outlines are restricted to the templates having high likelihoods and therefore the number of times matching is performed between the templates and the image is reduced. Thus, even in the case where the semi-bright pupil state occurs, the detection processing load may be lightened while maintaining outline detection accuracy.

In the above-described processing example 2-3, an example is described in which the outlines of the pupil and the iris are detected by using templates, but a method may also be adopted in which the outlines of the pupil and the iris are detected by circle detection processing using Hough transformation as another example. In this case, a likelihood is assigned to each diameter of circles that are detection targets in the circle detection processing. Then, all that has to be done is to weight the likelihoods in accordance with the edge detection result obtained by the edge-detecting unit 114 as described above.

Furthermore, as another example, an image characteristic amount corresponding to the dark pupil state and an image characteristic amount corresponding to the semi-bright pupil state may be used in the processing of detecting the outline of the pupil and the processing of detecting the outline of the iris. The image characteristic amounts are generated from an image captured in a dark pupil state and an image captured in a semi-bright pupil state through studies, for example. In such an example, likelihoods are assigned to each image characteristic amount and the likelihoods are weighted in accordance with the edge detection result obtained by the edge-detecting unit 114.

The processing functions of the devices described in each of the above embodiments (devices included in line-of-sight detection system 1, line-of-sight detection device 100) may be implemented by a computer. In this case, a program, in which the processing contents of the functions to be possessed by the devices are written, is supplied and the program is executed on a computer, as a result the processing functions are implemented by the computer. The program in which the processing contents are written may be recorded on a recording medium that is readable by the computer. Examples of a recording medium that is readable by a computer include a magnetic storage device, an optical disc, a magneto-optical recording medium, and a semiconductor memory. Examples of a magnetic recording device include a hard disk drive (HDD), a flexible disk (FD), and a magnetic tape. Examples of an optical disc include a digital versatile disc (DVD), a DVD-RAM, a compact disc-read only memory (CD-ROM), a CR-recordable (R)/rewritable (RW). Examples of a magneto-optical recording medium include a magneto-optical disk (MO).

In the case where the program is to be distributed, a portable recording medium such as a DVD or a CD-ROM on which the program is recorded is sold, for example. In addition, it is also possible to store the program on a storage device of a server computer and transfer the program to other computers via a network.

The computer that is to execute the program stores the program, which is recording on a portable recording medium or has been transferred from a server computer, on its own storage device, for example. The computer reads the program out from its own storage device and executes processing in accordance with the program. It is also possible for the computer to directly read the program out from the portable recording medium and execute processing in accordance with the program. Furthermore, it is also possible for the computer to execute processing in accordance with a successively received program each time the program is transferred from a server computer connected via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A line-of-sight detection method comprising:
    detecting, by a computer, an eye region of a subject from an image;
    setting a detection region in a horizontal direction in the eye region;
    detecting at least one of a first pair of edges provided in a first position of a first boundary between a pupil and an iris and a second pair of edges provided in a second position of a second boundary between the iris and a sclera based on a brightness change in the detection region;
    setting an average value of brightnesses between the first pair of edges as a brightness of the pupil, an average value of brightnesses between the second pair of edges as a brightness of the iris and a brightness at a position which is in the detection region and outside the second pair of edges as a brightness of the sclera when detecting both of the first pair of edges and the second pair of edges;
    setting an average value of brightnesses between the second pair of edges as a brightness of the iris, a brightness at a position which is in the detection region and outside the second pair of edges as a brightness of the sclera and the brightness of the iris or a brightness at one of the second pair of edges which is close to a center of the detection region as the brightness of the pupil when detecting the second pair of edges;
    detecting a first outline of the pupil by using a pupil outline detection template and detecting a third positon corresponding to a center of the pupil;
    detecting a second outline of the iris by using an iris outline detection template and detecting a fourth positon corresponding to the center of the pupil;
    calculating a first brightness difference between the brightness of the pupil and the brightness of the iris and a second brightness difference between the brightness of the iris and the brightness of the sclera;
    calculating likelihoods for the third position and the fourth position, respectively;
    weighting the likelihoods in accordance with the first brightness difference and the second brightness difference, respectively; and
    outputting, as the center of the pupil, one of the third position and the fourth position which has the higher likelihood.

2. The line-of-sight detection method according to claim 1, wherein the first position and the second position are detected by an edge detection operation in the detection region and brightness changes in a longitudinal direction of the detection region are detected.

3. The line-of-sight detection method according to claim 1, wherein the detection region is a line-shaped region or a band-shaped region.

4. The line-of-sight detection method according to claim 1, wherein the likelihoods are calculated based on at least one of matching evaluation values with the pupil outline detection template and the iris outline detection template when detecting the first outline and the second outline and specific likelihoods which are given in advance to the pupil outline detection template and the iris outline detection template when detecting the first outline and the second outline.

5. The line-of-sight detection method according to claim 1, wherein the edge detection operation includes:
    detecting one of the first position based on positional symmetry in the detection region of a first edge and a second edge of the first pair of edges in which brightness decreases between before and after the first edge, and brightness increases between before and after the second edge; and
    detecting the second position based on positional symmetry in the detection region of a third edge and a fourth edge of the second pair of edges in which brightness decreases between before and after the third edge, and brightness increases between before and after the fourth edge.

6. The line-of-sight detection method according to claim 1, wherein it is determined that the eye region is in a first state in which the pupil is brighter than the iris in a first case of detecting both of the first pair of edges and the second pair of edges and it is determined that the eye region is in a second state in which the pupil and the iris have the same brightness in a second case of detecting only the second pair of edges.

7. The line-of-sight detection method according to claim 5, wherein the edge detection operation includes:
detecting, from the eye region, a corneal reflection that corresponds to reflection of a light source from a cornea of the subject; and
determining, when the corneal reflection is contained in the detection region, that a position of the corneal reflection is any of a position where the first edge exists, a position where the second edge exists or a position where an edge does not exist based on a difference in the brightness between before and after the corneal reflection.

8. The line-of-sight detection method according to claim 6, further comprising:
detecting, from the eye region, a corneal reflection that corresponds to reflection of a light source from a cornea of the subject; and
determining, when the corneal reflection is contained in the detection region, that a position of the corneal reflection is any of a position where a first edge exists, a position where a second edge exists or a position where an edge does not exist based on a positional relationship between the first edge, the second edge and the corneal reflection.

9. A line-of-sight detection device comprising:
a memory; and
a processor coupled to the memory and configured to:
detect an eye region of a subject from an image,
set a detection region in a horizontal direction in the eye region;
detect at least one of a first pair of edges provided in a first position of a first boundary between a pupil and an iris and a second pair of edges provided in a second position of a second boundary between the iris and a sclera based on a brightness change in the detection region,
set an average value of brightnesses between the first pair of edges as a brightness of the pupil, an average value of brightnesses between the second pair of edges as a brightness of the iris and a brightness at a position which is in the detection region and outside the second pair of edges as a brightness of the sclera when detecting both of the first pair of edges and the second pair of edges,
set an average value of brightnesses between the second pair of edges as a brightness of the iris, a brightness at a position which is in the detection region and outside the second pair of edges as a brightness of the sclera and the brightness of the iris or a brightness at one of the second pair of edges which is close to a center of the detection region as the brightness of the pupil when detecting the second pair of edges,
detect a first outline of the pupil by using a pupil outline detection template and detect a third positon corresponding to a center of the pupil,
detect a second outline of the iris by using an iris outline detection template and detect a fourth positon corresponding to the center of the pupil,
calculate a first brightness difference between the brightness of the pupil and the brightness of the iris and a second brightness difference between the brightness of the iris and the brightness of the sclera,
calculate likelihoods for the third position and the fourth position, respectively,
weight the likelihoods in accordance with the first brightness difference and the second brightness difference, respectively, and
output, as the center of the pupil, one of the third position and the fourth position which has the higher likelihood.

10. The line-of-sight detection device according to claim 9, wherein the first position and the second position are detected by an edge detection operation in the detection region and brightness changes in a longitudinal direction of the detection region are detected.

11. The line-of-sight detection device according to claim 9, wherein the detection region is a line-shaped region or a band-shaped region.

12. The line-of-sight detection device according to claim 9, wherein the likelihoods are calculated based on at least one of matching evaluation values with the pupil outline detection template and the iris outline detection template when detecting the first outline and the second outline and specific likelihoods which are given in advance to the pupil outline detection template and the iris outline detection template when detecting the first outline and the second outline.

13. The line-of-sight detection device according to claim 9, wherein the edge detection operation includes:
detecting the first position based on positional symmetry in the detection region of a first edge and a second edge of the first pair of edges in which brightness decreases between before and after the first edge, and brightness increases between before and after the second edge; and
detecting the second position based on positional symmetry in the detection region of a third edge and a fourth edge of the second pair of edges in which brightness decreases between before and after the third edge, and brightness increases between before and after the fourth edge.

14. The line-of-sight detection device according to claim 9, wherein it is determined that the eye region is in a first state in which the pupil is brighter than the iris in a first case of detecting both of the first pair of edges and the second pair of edges and it is determined that the eye region is in a second state in which the pupil and the iris have the same brightness in a second case of detecting only the second pair of edges.

15. The line-of-sight detection device according to claim 13, wherein the edge detection operation includes:
detect, from the eye region, a corneal reflection that corresponds to reflection of a light source from a cornea of the subject, and
determine, when the corneal reflection is contained in the detection region, that a position of the corneal reflection is any of a position where the first edge exists, a position where the second edge exists or a position where an edge does not exist based on a difference in the brightness between before and after the corneal reflection.

16. The line-of-sight detection device according to claim 14, wherein the processor is configured to:

detect, from the eye region, a corneal reflection that corresponds to reflection of a light source from a cornea of the subject, and determine, when the corneal reflection is contained in the detection region, that a position of the corneal reflection is any of a position where a first edge exists, a position where a second edge exists or a position where an edge does not exist based on a positional relationship between the first edge, the second edge and the corneal reflection.

17. A non-transitory computer-readable recording medium storing a line-of-sight detection program for causing a computer to execute a process, the process comprising:

detecting an eye region of a subject from an image;

setting a detection region in a horizontal direction in the eye region;

detecting at least one of a first pair of edges provided in a first position of a first boundary between a pupil and an iris and a second pair of edges provided in a second position of a second boundary between the iris and a sclera based on a brightness change in the detection region;

setting an average value of brightnesses between the first pair of edges as a brightness of the pupil, an average value of brightnesses between the second pair of edges as a brightness of the iris and a brightness at a position which is in the detection region and outside the second pair of edges as a brightness of the sclera when detecting both of the first pair of edges and the second pair of edges;

setting an average value of brightnesses between the second pair of edges as a brightness of the iris, a brightness at a position which is in the detection region and outside the second pair of edges as a brightness of the sclera and the brightness of the iris or a brightness at one of the second pair of edges which is close to a center of the detection region as the brightness of the pupil when detecting the second pair of edges;

detecting a first outline of the pupil by using a pupil outline detection template and detecting a third positon corresponding to a center of the pupil;

detecting a second outline of the iris by using an iris outline detection template and detecting a fourth positon corresponding to the center of the pupil;

calculating a first brightness difference between the brightness of the pupil and the brightness of the iris and a second brightness difference between the brightness of the iris and the brightness of the sclera;

calculating likelihoods for the third position and the fourth position, respectively;

weighting the likelihoods in accordance with the first brightness difference and the second brightness difference, respectively; and outputting, as the center of the pupil, one of the third position and the fourth position which has the higher likelihood.

* * * * *